United States Patent [19]

Kanno et al.

[11] Patent Number: 4,933,757
[45] Date of Patent: Jun. 12, 1990

[54] ELECTRONIC ENDOSCOPE APPARATUS PROVIDED WITH A MOVEMENT DETECTING MEANS

[75] Inventors: Masahide Kanno; Masao Uehara; Masahiko Sasaki; Katsuyuki Saito; Akinobu Uchikubo; Shinji Yamashita; Katsuyoshi Sasagawa, all of Hachioji; Jun Hasegawa, Hino; Takehiro Nakagawa, Hachioji, all of Japan

[73] Assignee: Olympus Optical Co., Ltd., Tokyo, Japan

[21] Appl. No.: 378,952

[22] Filed: Jul. 12, 1989

[30] Foreign Application Priority Data

Aug. 20, 1988 [JP] Japan .................. 63-206949
Oct. 12, 1988 [JP] Japan .................. 63-257630
Feb. 13, 1989 [JP] Japan .................. 01-34429
Feb. 13, 1989 [JP] Japan .................. 01-34430

[51] Int. Cl.$^5$ .................. A61B 1/04; A61B 1/06; A04N 5/21
[52] U.S. Cl. .................. 358/98; 128/6; 358/105
[58] Field of Search .................. 358/98, 105; 128/6

[56] References Cited

U.S. PATENT DOCUMENTS

| | | | |
|---|---|---|---|
| 4,730,217 | 3/1988 | Tonge | 358/105 |
| 4,779,131 | 10/1988 | Matsumoto et al. | 358/105 |
| 4,868,650 | 9/1989 | Weckenbrock | 358/105 |
| 4,875,094 | 10/1989 | Haghiri | 358/105 |

FOREIGN PATENT DOCUMENTS 60-106288 6/1985 Japan .

Primary Examiner—Howard W. Britton
Attorney, Agent, or Firm—Armstrong, Nikaido, Marmelstein, Kubovcik & Murray

[57] ABSTRACT

There is disclosed an endoscope apparatus wherein it is judged whether a still picture is to be displayed or not for the movement quantity from a movement detecting circuit wherein difference signals are produced between pixels approaching a plurality of image signals of the same object imaged at different times and further the correlation between the corresponding difference signals is detected and is then quantified in a period of one field/frame.

26 Claims, 29 Drawing Sheets

FIG. 7
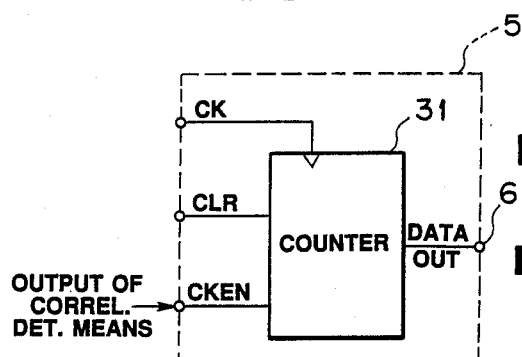
FIG. 8
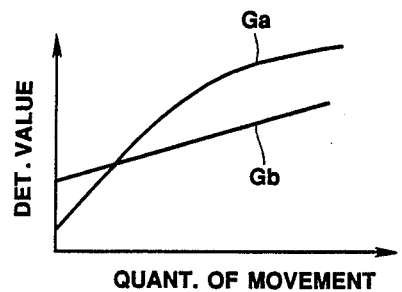
FIG. 9a R 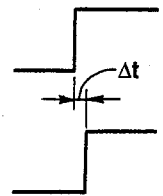
FIG. 9b G 
FIG. 9c Δ 
FIG. 9d ΔR 
FIG. 9e ΔG 
FIG. 9f ΔΔ 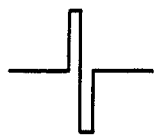
FIG. 9g ΔΔ' 

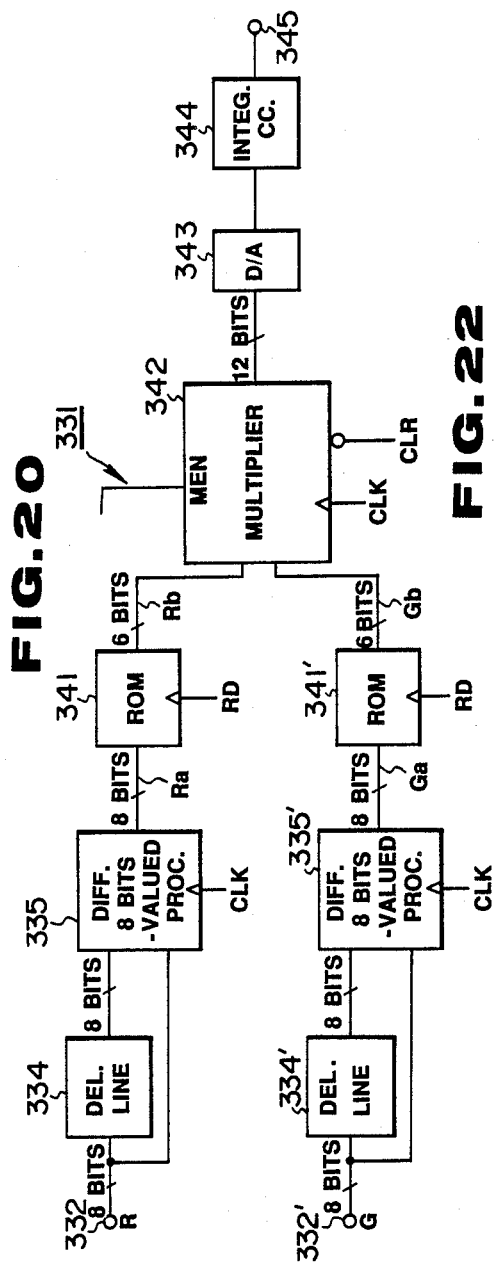
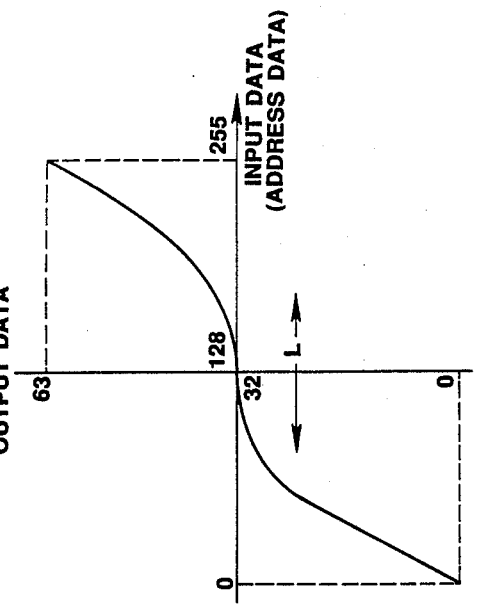
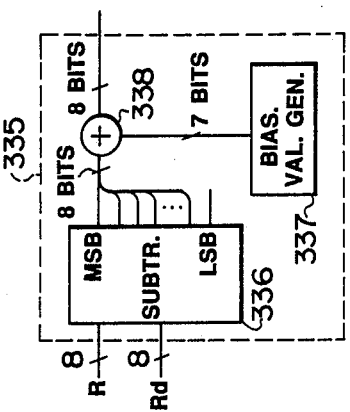

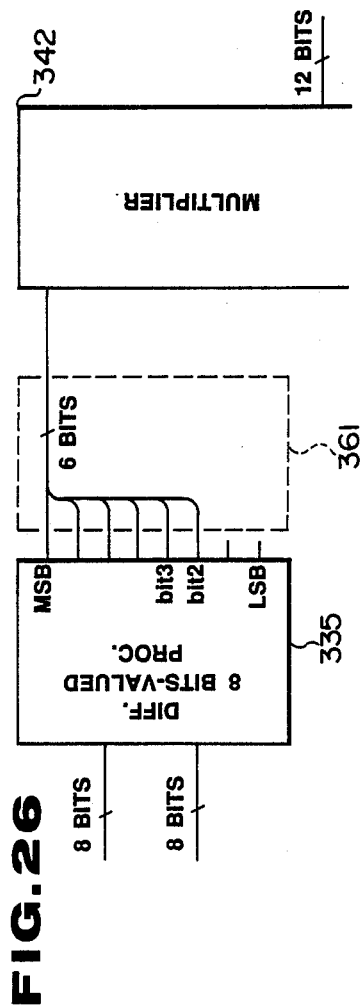

FIG. 35
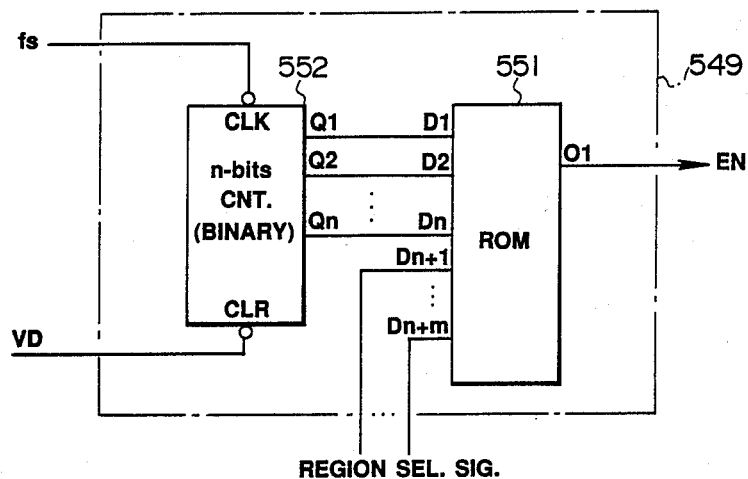
FIG. 36a
FIG. 36b
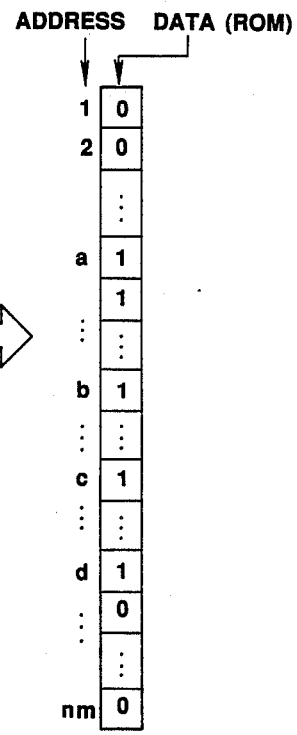

○ IMAGE NOT FROZEN
● IMAGE FROZEN
◉ IMAGE FROZEN (AND DISP.) AT LAST

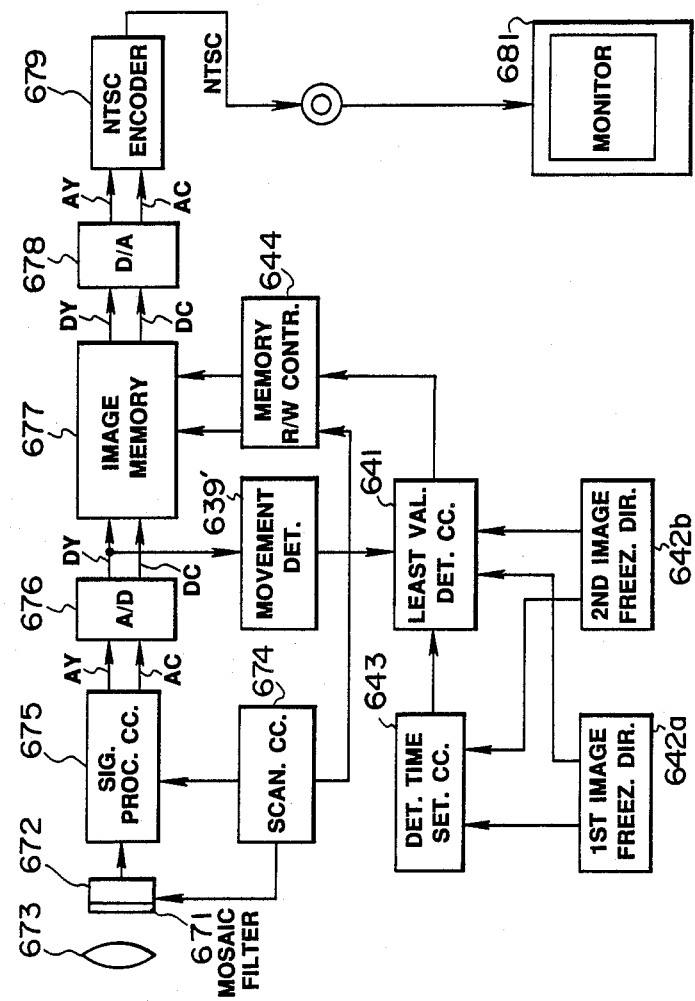

FIG.50
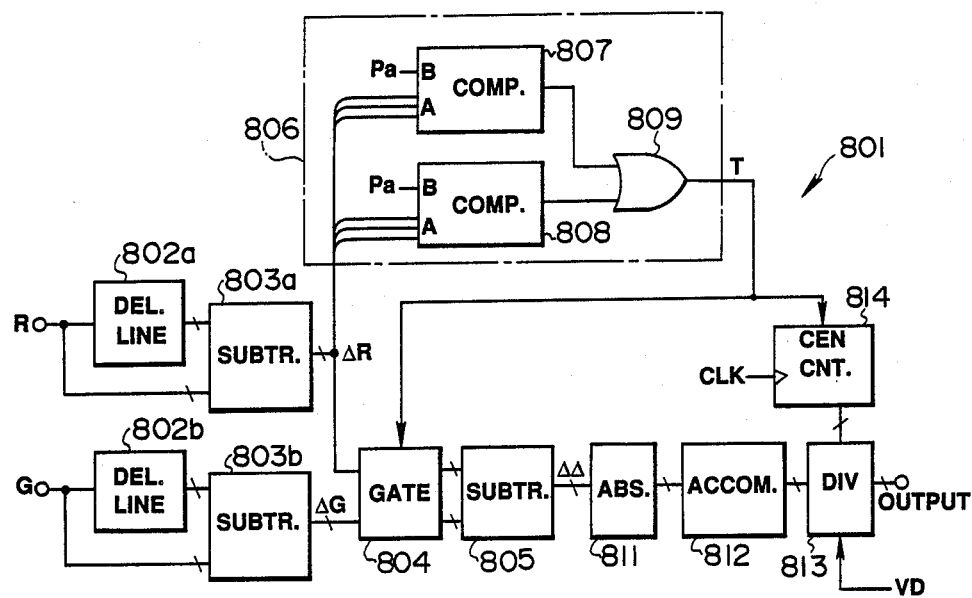
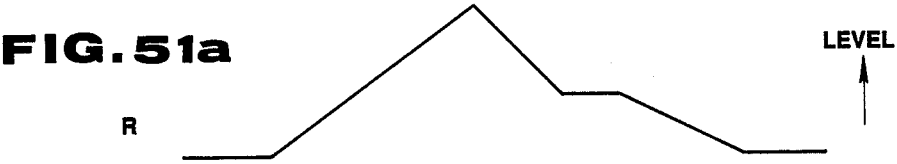
FIG.51a R
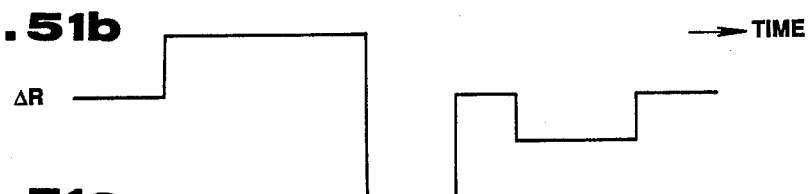
FIG.51b ΔR
FIG.51c T

ELECTRONIC ENDOSCOPE APPARATUS PROVIDED WITH A MOVEMENT DETECTING MEANS

BACKGROUND OF THE INVENTION

Field of the Invention and Related Art Statement

This invention relates to an electronic endoscope apparatus provided with a means of detecting the movement of an imaged object image.

Generally the movement of an image within such picture as a TV picture is largely divided into a movement by the movement of an object within the picture and a uniform movement of an entire image by the parallel movement of the camera. In the case of transmitting, for example, such image, for the purpose of efficiently utilizing the transmitting path, the band of the image is compressed.

A transmitting method wherein the part of a local movement of an object within an image is processed as a movement region, the movement in one direction of the entire image is processed as a still region by detecting a movement vector and a band compression stronger than in the still region is applied to the movement region is known and many movement detecting circuits have been devised and utilized.

However, in some case, depending on the use of the imaging apparatus, the size of the movement quantity may be positively detected without distinguishing the local movement of such image and the movement in one direction of the entire image from each other. For such use, there are not only a crime preventing apparatus, such adapted Y/C separating apparatus as is shown in the publication of a Japanese patent application laid open No. 106288/1985 and sequential scanning converting apparatus but also an apparatus displaying as a still picture output of an electronic endoscope apparatus used for a medical instrument an object image in a state as still as possible in a high resolution (that is to say, in a frame sequential imaging system, a frame freezing little in the color lag and image lag is made and, in a simultaneous imaging system, a frame freezing little in the field flicker is made).

By the way, in the above mentioned sequential imaging system, the object sequentially illuminated by illuminating lights of different wavelength regions is sequentially imaged and the images are then composited to be a color image. In the simultaneous system, a color imaging (image) is made by once imaging by an imaging means using color filters under a white color illumination.

By an ordinary movement detecting means, an accumulated value in corresponding pixels between generally different frames is determined and a movement quantity between the frames is detected.

In this method, even if the relative movement quantity between the frames is constant, it will be greatly influenced by the feature of the image (such as, for example, an image large in the structure variation or an image not varying so much in the structure/outline).

Needless to say, in most cases, it is desirable that, if the structure/outline part lags, the movement quantity will be detected to be large. However, it is desirable that a movement adapted to the use is detected.

Therefore, in a U.S. Pat. No. 4,779,131, it is disclosed that a movement is detected by accumulating difference values of corresponding pixels between different frames so that, in case the difference value is below a preset value, that pixel part will be considered to have no movement and the difference value will not be accumulated to elevate the reliability of the movement detection.

However, even if the difference value of the pixels between the frames is small, the movement quantity between both pixels will not be always small. For example, if both pixels represent parts having no ruggedness, even if a relative movement is present, it will not be able to be detected as a movement detection.

Also, in a U.S. Pat. No. 4,779,131, it is disclosed that a movement quantity is detected from a signal one frame before so that, in case the movement is large, a processed signal will be output. In a Japanese patent application laid open No. 106288/1985, the difference values of pixels near a luminance signal of both frames as well as the difference signals between the frames of the luminance signal are accumulated to determine the total sum of the movement quantities for all the pixels in both frames and the movement is detected by using this total sum of the movement quantities and the above mentioned difference signals between the frames.

In this prior art example, the circuit scale of the part of accumulating the difference values between the respective pixels of both frames and the pixels near the frames' will become so large that the cost will be also high.

OBJECTS AND SUMMARY OF THE INVENTION

An object of the present invention is to provide an electronic endoscope apparatus provided with a movement detecting means of a simple formation for various uses.

Another object of the present invention is to provide an electronic endoscope apparatus whereby a still image little in the image movement is obtained.

In the present invention, there is formed a movement detecting means whereby the difference signals of the respective pixels and nearby pixels of the respective plurality of image signals obtained by imaging the same object at times different from each other are determined and are relatively detected by comparison and multiplication between a plurality of corresponding difference signals so as to be quantified.

BRIEF DESCRIPTION OF THE DRAWINGS

FIGS. 1 to 9 relate to the first embodiment of the present invention.

FIG. 1 is a generatl formation diagram of an electronic endoscope apparatus of the first embodiment.

FIG. 2 is a basic formation diagram of a movement detecting circuit used in this apparatus.

FIG. 3 is a formation diagram of a coding means.

FIG. 4 is a formation diagram of a difference n valuing means.

FIG. 5 is a formation diagram of a correlation detecting means (comparing means).

FIG. 6 is an operation explaining diagram of the correlation detecting means.

FIG. 7 is a formation diagram of a quantifying means.

FIG. 8 is a characteristic diagram showing an example of a movement detecting characteristic of a movement detecting circuit.

FIG. 9 is an explanatory diagram of the movement detecting function of a movement detecting circuit.

FIG. 10 is a formation diagram of a movement detecting circuit used in the second embodiment.

FIG. 11 is a formation diagram of an electronic endoscope apparatus of the second embodiment.

FIG. 20 is a concrete circuit diagram of the movement detecting circuit in the third embodiment.

FIG. 21 is a concrete formation diagram of a difference 8-bit making processing circuit in FIG. 20.

FIG. 22 is a characteristic diagram showing non-linear input and output characteristics of an ROM as a non-linear processing means.

FIG. 26 is a formation diagram of a modification making a 2-bit shift down.

FIG. 27 is a formation diagram of a movement detecting circuit of another modification different from that of FIG. 20.

FIG. 35 is a circuit diagram of a region setting circuit in the fourth embodiment.

FIG. 36 is an operation explaining diagram of FIG. 35.

FIG. 48 is a formation diagram of an essential part of an electronic endoscope apparatus of the tenth embodiment of the present invention.

FIG. 50 is a block diagram showing the formation of another movement detecting circuit.

FIG. 51 is an operation explaining diagram of FIG. 51.

DETAILED DESCRIPTION OF THE PREFERRED EMBODIMENTS

Figure 2:
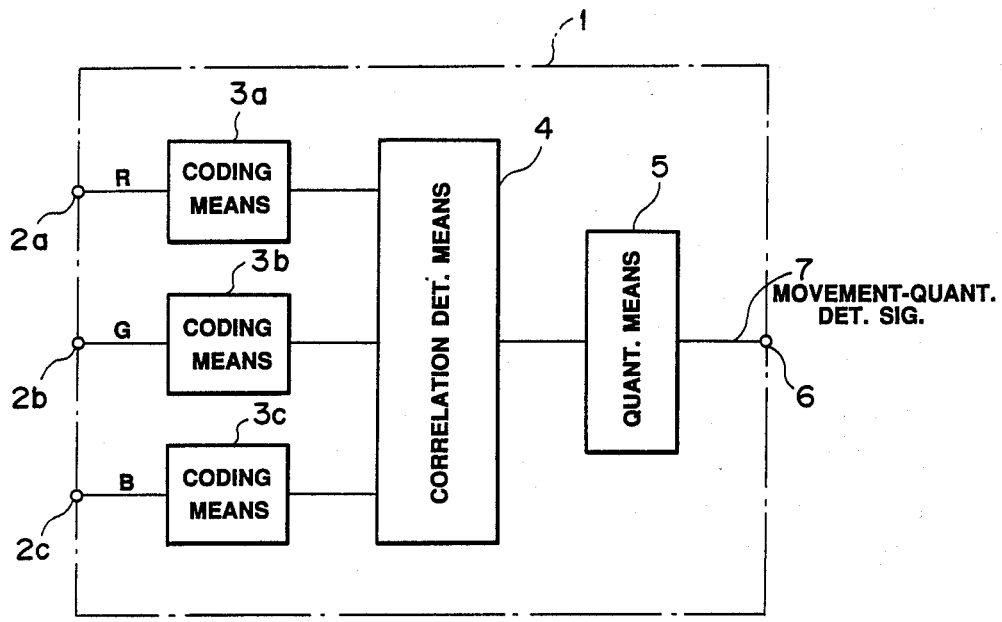

As shown in FIG. 2, in a movement detecting circuit 1 used for the first embodiment, in coding means 3a, 3b and 3c provided respectively with input ends 2a, 2b and 2c to which synchronized R, G and B signals are respectively applied, pixel difference signals of the respective input signals are n-valued and the n-valued signals are coded and output. The respective n-valued output signals are schematically considered to be made by approximating the differential outputs of the input signals with n kinds of direction vectors. Therefore, if the respective input signals R, G and B are correlated, the direction vectors of the respective signals will coincide or will be similar but, if they are not correlated, the direction vectors will not coincide or will not be similar. Therefore, when the respective signals are compared with the above mentioned coded output signals by a correlation detecting means (comparing means) 4 and are further quantified by a quantifying means 5, the size of the movement quantity will be able to be detected and will be output from an output end 6 as a movement quantity detecting signal 7. Here, for the explanation, the input signals are made R, G and B but the combination of the input signals is not limited to this here and also in the following explanation.

Figure 3:
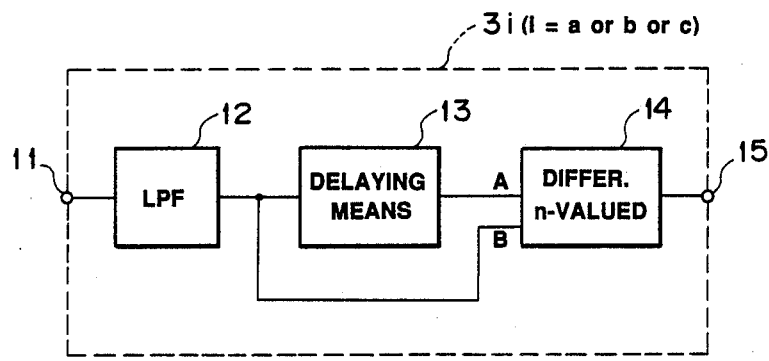

FIG. 3 shows a concrete block formation of the above mentioned coding means 3a, 3b or 3c (which shall be represented hereinafter by 3i wherein i=a, b or c) applied to the case of detecting the movement in the horizontal or vertical direction.

Such image signal as of R, G and B as an input signal is input into a low pass filter (abbreviated as LPF) 12 through an input end 11. The input signal is limited in the band as predetermined in this LPF and is input into a difference n-valuing means 14 with one part of it through but the other part not through a delaying means 14. This delaying means 13 is to delay the image signal by one sample period. Two input signals of the delayed image signal A and non-delayed image signal B are input into the difference n-valuing means 14 and are compared with each other. As a result, the image signals as n-valued in a decoded type or encoded type are output. The output signals are input into a correlation detecting means 4 through output ends 15.

Figure 4:
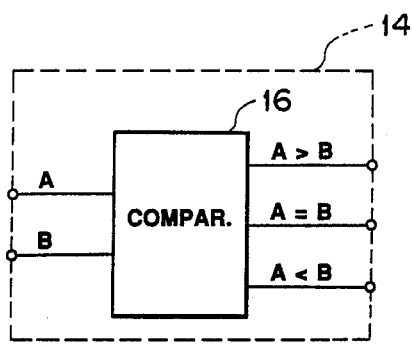

FIG. 4 shows the formation of the above mentioned difference n-valuing means 14.

The two input signals A and B are compared with each other in a comparator 16. Signals of A>B, A=B and A<B are output in a decoded type respectively through three output ends.

Figure 5:
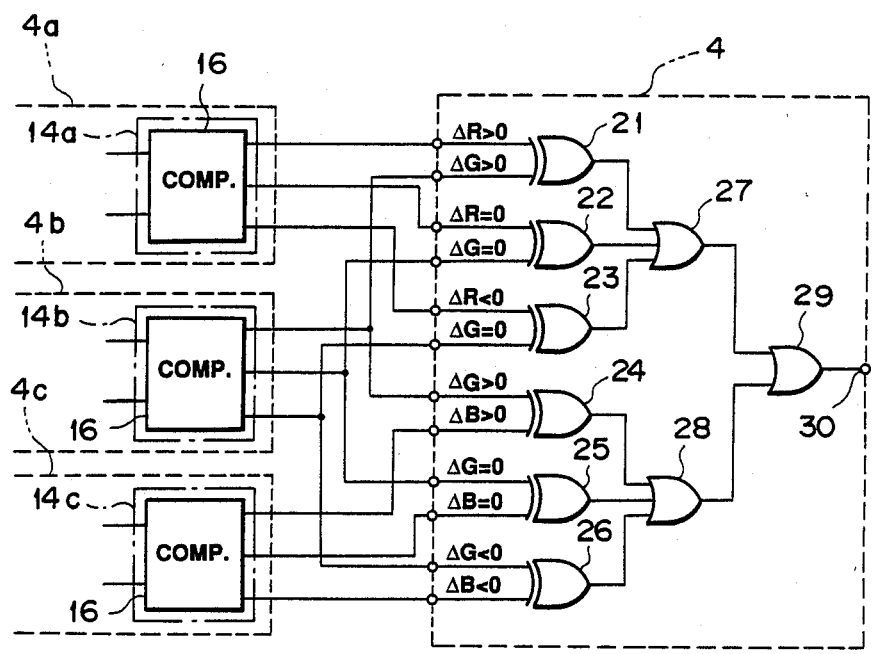

Next, the concrete formation of the correlation detecting means 4 is shown in FIG. 5.

In this case, the input signals are the difference 3-valued signals of the decoded type shown in FIG. 4. That is to say, A>B, A=B and A<B correspond respectively to $\Delta R>0$ (or $G>0$ or $\Delta B<0$), $\Delta R=0$ (or $\Delta G=0$ or $\Delta B=0$) and $\Delta R<0$ (or $\Delta G<0$ or $\Delta B<0$) and $\Delta R$, $\Delta G$ and $\Delta B$ represent the differences of the respective signals.

Respective exclusive logical sums, that is, coincidences or non-coincidences are detected by respectively passing $\Delta R>0$ and $\Delta G>0$ through an exclusive logical sum (EX-OR hereinafter) circuit 21, R=0 and G=0 through an EX-OR circuit 22, $\Delta R<0$ and $\Delta G<0$ through an EX-OR circuit 23, $\Delta G>0$ and $\Delta B>0$ through an EX-OR circuit 24, $\Delta G=0$ and $\Delta B=0$ through an EX-OR circuit 25 and $\Delta G<0$ and $\Delta B<0$ through an EX-OR circuit 16, logical sums are taken respectively through logical sum circuits (OR circuits) 27 and 28 of these three inputs, then further a logical surm is taken through an OR circuit 29 of the two inputs and a correlation between the respective signals is determined and is output to a quantifying means 5 through an output end 30. Here, either one circuit of the EX-OR circuits 21, 22 and 23 and either one circuit of the EX-OR circuits 14, 25 and 26 are not always necessary. (By the way, in FIG. 5, the difference n-valuing circuits 14 formed by using the comparators 16 of FIG. 4 are represented respectively by 14a, 14b and 14c.)

Figure 6:
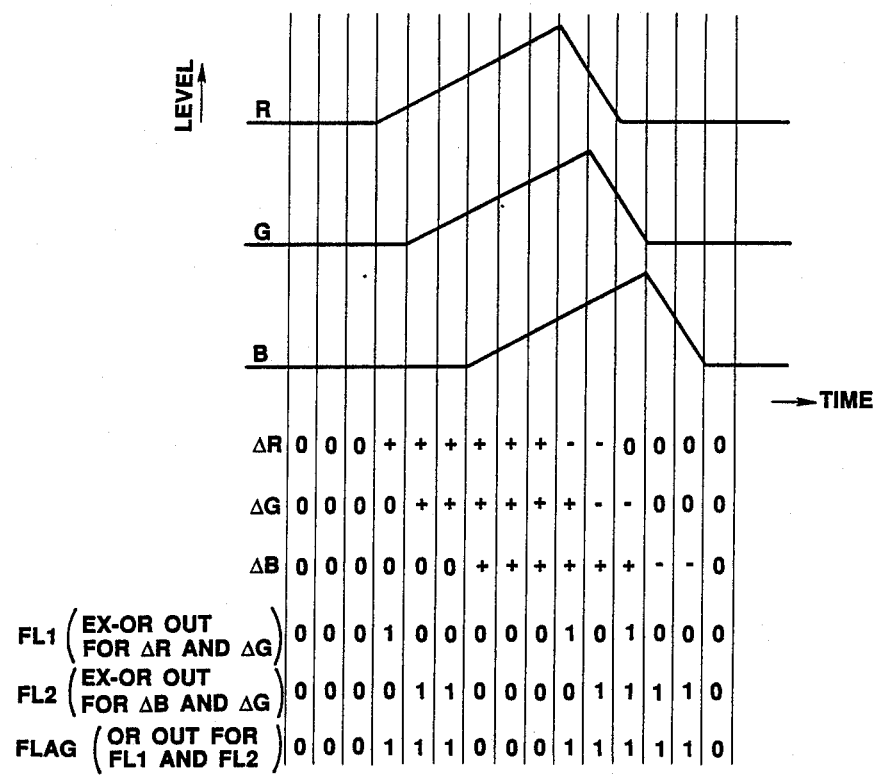

The manner of the correlation detection in the above mentioned correlation detecting means 4 is represented by a visual model as in FIG. 6.

As shown in FIG. 6, the levels of image signals R, G and B of the ordinate vary in the time with the time of the abscissa. That is to say, when a movement is produced, difference 3-valued signals (represented by +, 0 and − for convenience) at predetermined sample intervals will be as shown on the right side of the respective $\Delta R$, $\Delta G$ and $\Delta B$. Therefore, the outputs of the OR circuit 27, 28 and 29 in FIG. 5 will be respectively as shown by FL1, FL2 and FLAG in FIG. 6. Here, if FL1 and FL2 are compared with each other, it will be found that the larger the movement quantity, the longer the output period of the high levels of the OR circuits 27 and 28.

FIG. 7 shows a formation example of the qunatifying means 5 formed of a counter 31. When the output of the correlation detecting means 4 is applied to a clock enabling terminal (CKEN) of the counder 31 and predetermined clocks CK from a clock generator not illustrated are counted, signal data quantified in response to the movement quantity will be obtained at the output end 6. By the way, a pulse in response to the period of the picture signal to be an object of the correlation is applied to a clear terminal CLR. For example, if a vertical synchronized pulse is applied by one field/frame, the movement quantity in one field/frame will be quantified.

According to the above mentioned first embodiment, a movement detecting circuit hard to be influenced by the contents (such as the APL, tone and frequency component) of the image can be realized. For example, the relations between the movement quantity and detected value for an image Ga in which the edge can be definitely found and a generally flat image Gb are as shown in FIG. 8. It can be confirmed that, in both images Ga and Gb, the detected value shows a uniformly increasing trend with the increase of the movement quantity. According to this first embodiment, the size of the movement quantity of the image signal can be quantified at a high precision. Thus, the embodiment can be applied to such signal processing apparatus as utilizes the movement information.

Figure 1:
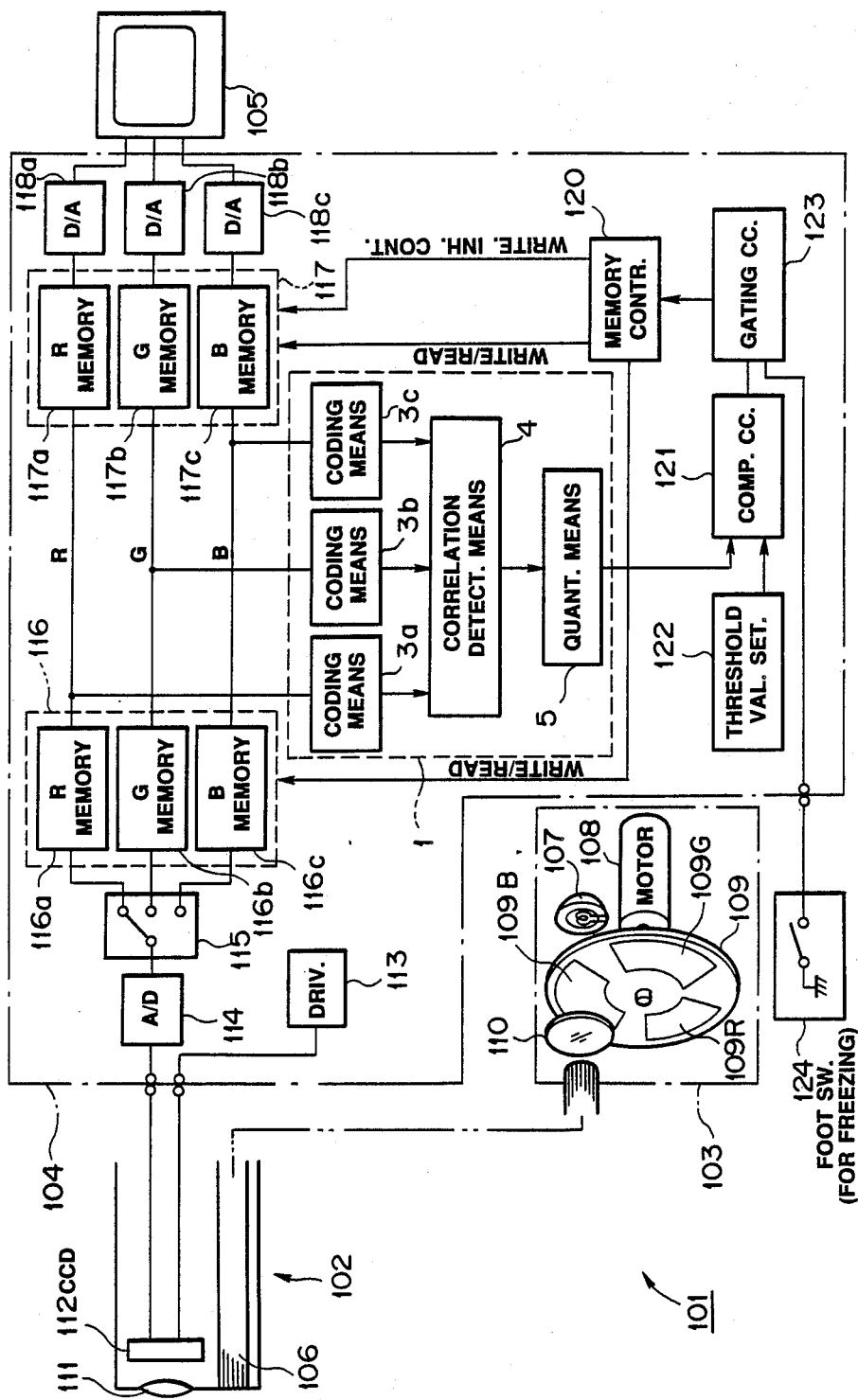

An electronic endoscope apparatus 101 using this movement detecting circuit 1 is shown in FIG. 1.

This electronic endoscope apparatus 101 comprises an electronic scope 102 having a frame sequential type imaging means built-in, a frame sequential type light source unit 103, a signal processing circuit 104 provided with the movement detecting circuit 1 of the first embodiment for the electronic scope 102 and a color monitor 105 color-displaying three primary color signals R, G and B output from this signal processing circuit 104.

In the above mentioned scope 102, a light guide 106 is inserted through an elongate insertable part and is connected to a light source unit 103 to feed a frame sequential light from the light source unit 103.

With this light source unit 103, a white color light of a lamp 107 is passed through a rotary color filter 109 rotated by a motor 108 and fitted like sectors with color transmitting filters 109R, 109G and 109B of red, green and blue to be made frame sequential lights of red, green and blue and is radiated to the entrance end surface of the light guide 106 through a condenser lens 110.

The light is transmitted by this light guide 106 and is radiated toward a front object from the exit end surface at the tip of the insertable part. An image of the illuminated object is formed on a CCD 112 by an objective lens 111 fitted to the tip part of the insertable part. The optical image is photoelectrically converted by this CCD 112, is read out by a driving signal output from a CCD driving circuit 113, is made a digital color frame sequential signal by an A/D converter 114 and is written through a multiplexer 115 into an R memory 116a, G memory 116b and B memory 116c within a synchronizing memory part 116 in response to the respective colors. The memory part 116 is controlled by a controller 120 in writing in and reading out the signal. The R, G and B color signals sequentially written into the above mentioned memories 116a, 116b and 116c are simultaneously read out to be synchronized color signals and are written respectively into an R memory 117a, G memory 117b and B memory 117c of a freezing memory part 117 in the next step.

The R, G and B color signals read out of the above mentioned memory part 117 are converted respectively to analogue color signals by D/A converters 118a, 118b and 118c and are output together with a synchronizing signal not illustrated into a color monitor 105 to display the image of the imaged object.

The signals are written into/read out of the above mentioned freezing memory part 117 usually per frame by the memory controller 120.

On the other hand, when a freezing directing signal is input into this memory controller 120, a writing inhibiting controlling signal will be output to the freezing memory part 117 to hold a still picture in the freezing memory part 117. That is to say, the writing is inhibited and the picture immediately before this writing inhibition is held as a still picture which is repeatedly displayed in the color monitor 105.

The control signal displaying this still picture is produced on the basis of the movement quantity of the movement detecting circuit 1 of the first embodiment. That is to say, the color signals R, G and B output from the above mentioned synchronizing memory 116 are input also into the movement detecting circuit 1 of the first embodiment and the movement quantity of the object is detected by this circuit 1 and is input into a comparing circuit 121.

In this comparing circuit 121, a set value corresponding to a preset allowable limit movement quantity is input from a threshold value setting circuit 122 and these are compared.

That is to say, in case the detected movement quantity is within the allowable set value, a freezing allowing signal will be output to a gate circuit 123 in the next step.

Also, in this gate circuit 123, a freezing directing signal can be input by a foot switch 124. While this foot switch 124 is on to output a freezing directing signal, if an allowing signal is output from the above mentioned comparing circuit 121, the gate will be opened and a freezing directing signal will be output to the memory controller 120.

When a freezing directing signal is input from this gate circuit 123, the memory controller 120 will output a writing inhibiting controlling signal to the freezing memory Part 117.

By this writing inhibiting signal, in the memory part 117, the image data written in just before this signal will be held without being renewed. Therefore, these image data will be repeatedly read out and therefore a still picture will be displayed in the color monitor 5.

By the way, the still picture may be displayed, for example, while the foot switch 124 is pressed or may be displayed for a fixed time and then may be released by again pressing the foot switch 124.

This electronic endoscope apparatus 101 is characterized in that accumulated values of movement quantities of pixel vectors of respective images imaged respectively at different times are determined and compared and then whether the still picture is to be displayed or not is judged by using the quantifying movement detecting circuit 1.

The function of the movement detection of this movement detecting circuit 1 is conceptionally a secondary difference processing, whereas the function of the movement detection of an ordinary movement detecting means is a primary difference processing. This reason shall be explained in the following with reference to FIG. 9. Two image signals imaging the same object at different times shall be represented by R and G. These two image signals R and G are simultaneously read out and synchronized, for example, by the memory part 116 in FIG. 1 so as to be signals shown respectively in FIGS. 9a and 9b. In this case, it shall be assumed that the signals R and G representing the object are lagged by a time $\Delta t$ due to the movement of the object. When the two image signals R and G are passed through an ordinary movement detecting circuit, the difference of the signal levels in the pixels corresponding to both signals R and G will be determined and therefore the difference signal $\Delta$ will be as in FIG. 9c. (This difference signal $\Delta$ is then generally accumulated.)

On the other hand, in the first embodiment, as the differences are determined in the respective image signals R and G, the respective difference signals $\Delta R$ and $\Delta G$ will be as in FIG. 9d and 9e. When these difference signals $\Delta R$ and $\Delta G$ are compared, for example, by a correlation detecting means, such signal $\Delta\Delta$ as in FIG. 9f will be produced. (The correlation can be detected not only by comparison but also by multiplication.) The subsequent processes will be substantially the same.

As understood from the comparison of FIGS. 9c and 9f, whereas the ordinary movement detection is a primary difference processing, the movement detecting means of this embodiment is a secondary difference processing.

When the above mentioned correlation detecting means makes a one-polarity process, the output signal $\Delta'$ in such case will be as in FIG. 9g and the same result as in FIG. 9c will be able to be obtained.

Therefore, if this movement detecting circuit 1 is used, the same movement detection as the ordinary one will be able to be set to be made, a movement detecting condition different in response to the use will be able to be set and thus there will a wider application range.

Also, in determining difference signals in the respective frames/fields, as the movement is not detected by accumulating them but the correlation is detected by the corresponding difference signals themselves, the circuit formation can be made simpler and the processing time can be made shorter than in the prior art example wherein the accumulated values are determined.

In the above mentioned first embodiment, the movement is detected on the color signals R, G and B imaged respectively at different times with illuminating lights of different wavelength regions.

In this case, in case the color signals R, G and B forming one color image have no movement, it will be necessary that the correlation between the respective component images should be large. In the case of an endoscope image, this condition will be met.

Figure 10:
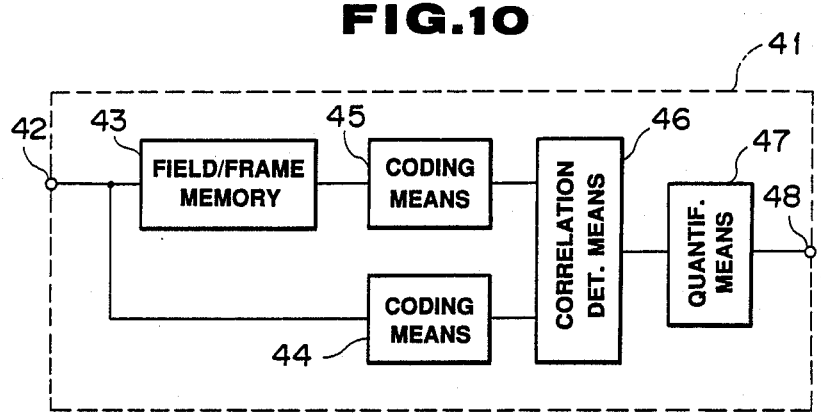
FIGS. 10 and 11 relate to the second embodiment of the present invention.

On the other hand, in the case of detecting the movement on the images imaged at different times under the illumination of the same wavelength, such movement detecting circuit 41 as is shown in FIG. 10 can be used.

The image signals imaged at different times are input into a frame (or field) memory 43 through an input end 42 and are input into a coding means 44. The image signals delayed in the period by one frame (or field) by the frame (or field) memory 43 are input into a coding means 45. These coding means 44 and 45 n-value and code the sample value difference signals of the respective input signals in each predetermined sampling cycle and output the coded signals. The output coded signals are input into a correlation detecting means 46, are compared, are then input into a quantifying means 47, are quantified and are output as signals quantified in response to the movement quantity from the output end 48.

The above mentioned coding means 44 and 45 can be formed of that shown in FIG. 3. Also, the one in the first embodiment can be applied to the correlation detecting means 46 and 47.

Figure 11:
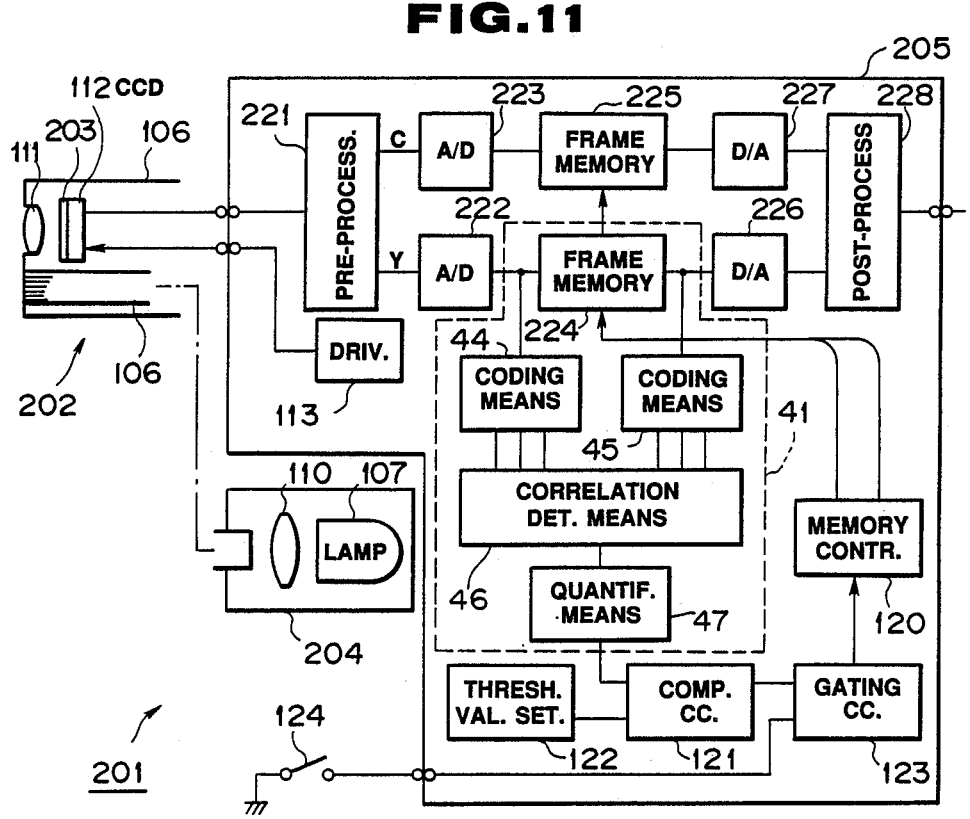

An electronic endoscope apparatus 201 of the second embodiment using this movement detecting circuit is shown in FIG. 11.

This apparatus 201 is a simultaneous type apparatus obtaining color signals under a white color illumination.

An electronic scope 202 used in this apparatus 201 is fitted with a color separating mosaic filter 203 on the front surface of the CCD 112, that is, in front of the imaging surface in the electronic scope 102 in FIG. 1.

A light source unit 204 feeding an illuminating light to this electronic scope 202 is the light source unit 103 in FIG. 1 in which the motor 108 and rotary color filter 109 are removed, that is to say, the white color light of the light source lamp 107 is condensed by the condenser lens 110 and is fed to the light guide 106.

Now, the signal read out of the CCD 112 is input into a pre-processing circuit 221 within a signal processing circuit 205. This pre-processing circuit 221 processes to separate the signal into a luminance signal y and line sequential color difference signals R-Y and B-Y (represented by C) which are then converted to digital signals respectively by A/D converters 222 and 223 and are then input respectively into frame memories 224 and 225.

The signals temporarily memorized in the above mentioned frame memories 224 and 225 are simultaneously read out, are converted to analogue signals Y and C respectively through D/A converters 226 and 227 and are input into a post-processing circuit 228. This post-processing circuit 228 includes a circuit synchronizing the color difference signals C and an NTSC encoder and outputs a composite signal and the object image is displayed in the color monitor 105.

In the above mentioned frame memories 224 and 225, the writing and reading are made usually in one predetermined frame period. That is to say, the writing and reading are made in a 1/30 [sec] period in the NTSC system and a moving image is displayed in the color monitor 105.

Now, in the movement detecting circuit 41 of the second embodiment applied to this apparatus 201, the frame memory 224 is formed to be used also for the signal made by A/D-converting the luminance signal Y.

The output of the quantifying means 47 forming this movement detecting circuit 41 is input into the comparing circuit 121 the same as in the first embodiment and is compared with the value of the threshold value setting circuit 122. In case the foot switch 124 is operated on the basis of the output signal of this comparing circuit 121, freezing will be controlled as to whether the still picture is to be held in the frame memory 224 or not.

The operation and effect of the apparatus 201 of this second embodiment are substantially the same as in the first embodiment.

By the way, the movement detecting circuit 41 shown in FIG. 10 can be applied to the frame sequential type apparatus 101 shown in FIG. 1.

Figure 12:
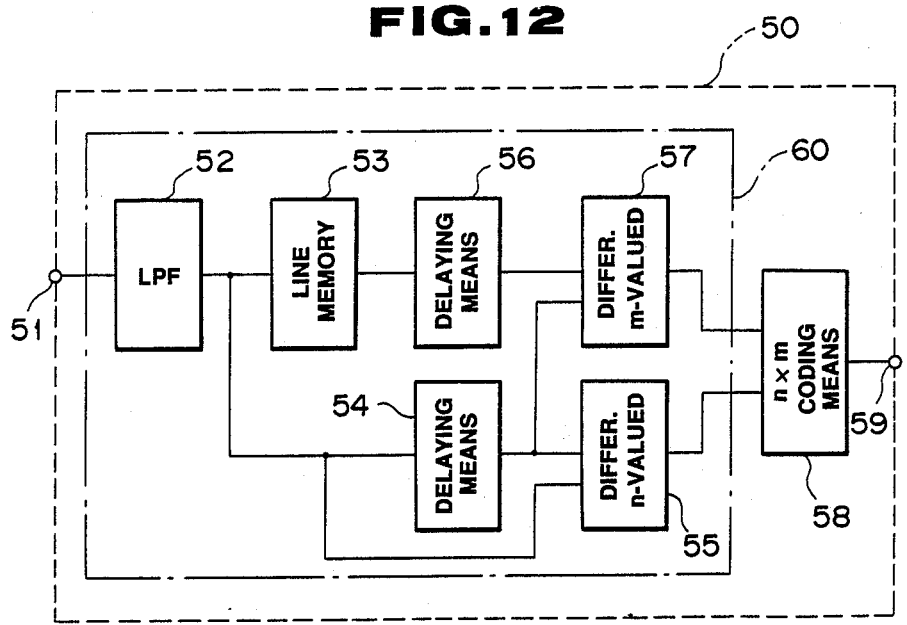
FIG. 12 is a formation diagram showing another embodiment of a coding means which can be used for the movement detecting circuit in FIG. 2 or 10.

By the way, the coding means 50 shown in FIG. 12 can be used for the coding means 4, 44 and 45 in FIGS. 3 and 10.

That is to say, whereas the coding means 4 in FIG. 3 detects the movement in either of the horizontal direction and vertical direction, FIG. 12 shows the concrete formation in the case of detecting the movement in the horizontal direction and vertical direction.

The image signal is input into an LPF 52 through an input end 51, is limited in the band as predetermined in this LPF and is input into a line memory 53, delaying means 54 delaying the signal by one pixel or several pixels and difference n-valuing means 55. The signal delayed by a predetermined horizontal line period, that is, by one horizontal period or several horizontal periods by the line memory 53 is delayed by a delaying means 56 to be corrected in the delay with the output of the above mentioned delaying means 54 and is then input into a difference m-valuing means 57.

The signal delayed by one sample cycle, that is, by one pixel or several pixels by the above mentioned delaying means 54 is input into the difference n-valuing means 55 and difference m-valuing means 57. The difference n-valuing means 55 compares the two signals approaching in the horizontal direction at intervals of the above mentioned one sample cycle, n-values the resultant signal in a decoding type or encoding type and outputs it to an n×m coding means 58. At the same time, the difference m-valuing means 57 compares the two signals approaching in the vertical direction at the above mentioned predetermined horizontal line intervals, m-values the resultant signal in a coding type or encoding type and outputs it to the n×m coding means 58.

The outputs of the above mentioned difference n-valuing means 55 and difference m-valuing means 57 are conceptionally considered to be partial differential outputs in the horizontal direction and vertical direction in the input signals as approximated respectively by the n-kind and m-kind direction vectors.

Therefore, it can be considered that the gradients at the respective sample points of the input signals are approximated by the n×m kind direction vectors by combining these two outputs. This combination is made by the n×m coding means 58 and is output to the comparing means 46 (which may be 4 in FIG. 2).

Figure 13:
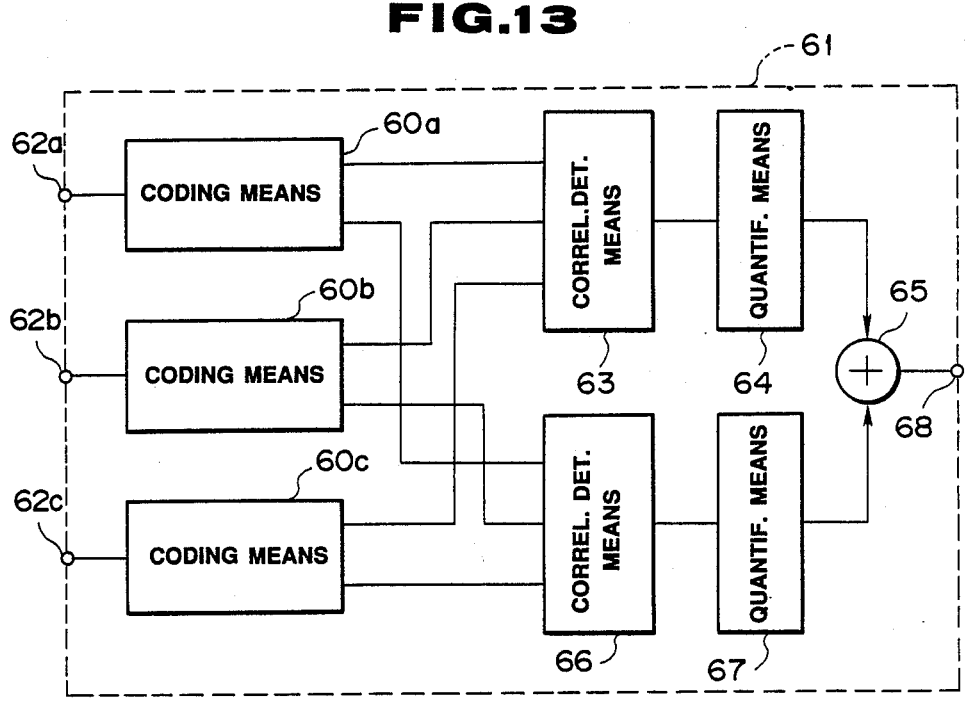
FIG. 13 is a formation diagram showing another embodiment of the movement detecting circuit shown in FIG. 2.

FIG. 13 shows a movement detecting circuit 61 of the fourth embodiment of the present invention.

This movement detecting circuit 61 can be applied to a frame sequential imaging system the same as in the first embodiment.

This movement detecting circuit 61 is an example of the case that, without determining the gradient by the n×m coding means 58 of the third embodiment shown in FIG. 12, the partial differential outputs in the horizontal direction and vertical direction are respectively independently compared and quantified and the movement quantity is detected by the addition output.

By the way, coding means 60a, 60b and 60c are of the same formation as of the part 60 shown by the one-point chain lines in FIG. 12.

Synchronized R, G and B signals are applied respectively to input ends 62a, 62b and 62c and difference n-valued outputs in the horizontal direction and difference m-valued outputs in the vertical direction are obtained respectively by coding means 60a, 60b and 60c. The difference n-valued outputs in the horizontal direction are compared by a correlation detecting means 63, this compared output is input into a quantifying means 64 to be quantified and is input into an adder 65. At the same time, the difference m-valued outputs in the vertical direction are input into a correlation detecting means 66, the compared output compared for the detection of the correlation is input into a quantifying means 67, is quantified and is input into the adder 65. The adder 65 adds the above mentioned two signals and outputs through an output end 68 the signal quantified in response to the movement quantity.

Now, the Part formed of the outputs of the above mentioned quantifying means 64 and 67 and adder 65 may be processed to be weighted, that is, may be added by weighting.

Figure 14:
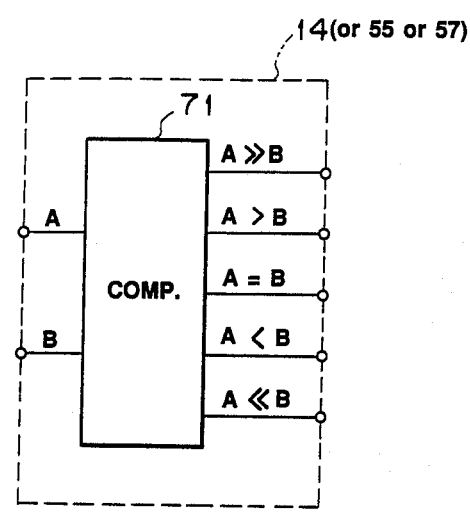
FIGS. 14 and 15 are diagrams showing concrete examples of a difference n valuing means.
Figure 15:
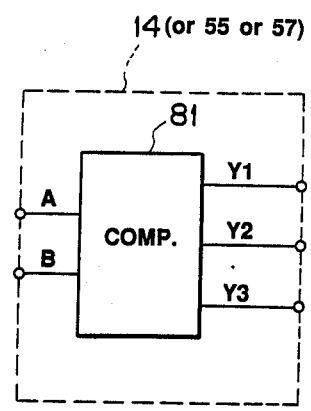

FIGS. 14 and 15 show other formation examples of the difference n-valuing (or m-valuing) means 14. Also, this means can be used for 55 and 57 in FIG. 12.

FIG. 14 shows a comparator 71 5-valuing the difference by using an ROM or PLD (programable logic device) and outputting the five values of A>>B, A>B, A=B, A<B and A<<B in a decoding type.

In this formation example, the threshold values respectively of A>>B and A>B and of A<<B and A<B can be optionally selected.

FIG. 15 is to output a 5-valued output in an encoded type by using a comparator 81 from which encoded outputs Y1, Y2 and Y3 are output against the inputs A and B. The relation between the input and output in this case is as in Table 1.

TABLE 1

|  | Y1 | Y2 | Y3 |
|---|---|---|---|
| A >> B | 1 | 1 | 0 |
| A > B | 1 | 0 | 0 |
| A = B | 0 | 0 | 0 |
| A < B | 0 | 0 | 1 |
| A << B | 0 | 1 | 1 |

Figure 16:
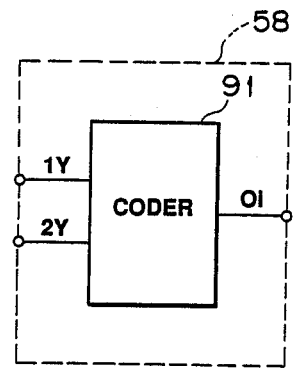
FIG. 16 is a formation diagram of the n×m coding means of FIG. 12.

FIG. 16 shows a formation example of the n×m coding means 58 (shown in FIG. 12).

This n×m coding means 58 forms a coder 91 by using an ROM or PLD to realize, for example, a 3×3 coding means. The relation between the input and output of this coder 91 is shown in Table 2 wherein the outputs 01 to 09 may be in a decoded type or encoded type.

TABLE 2

| 2Y  2Y | C > D | C = D | C < D |
|---|---|---|---|
| A > B | 01 | 02 | 03 |
| A = B | 04 | 05 | 06 |
| A < B | 07 | 08 | 09 |

Figure 17:
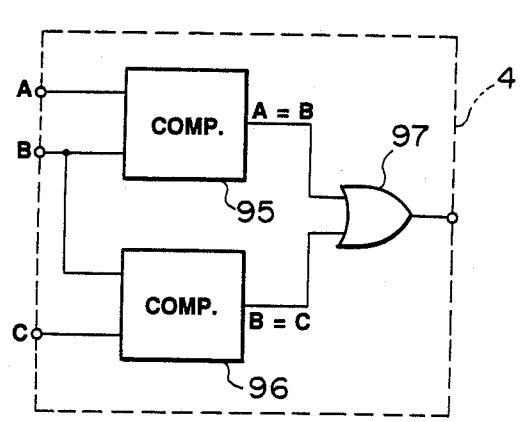
FIG. 17 is a formation diagram of the correlation detecting means of FIG. 2.

FIG. 17 shows a formation example of the correlation detecting means 4. In FIG. 5, the input is a difference 3-valued signal in a decoded type, whereas, in this embodiment, the input is a difference n-valued signal in an encoded type. The embodiment is formed of two comparators 95 and 96 and an OR circuit 97 for the input signals A, B and C.

Figure 18:
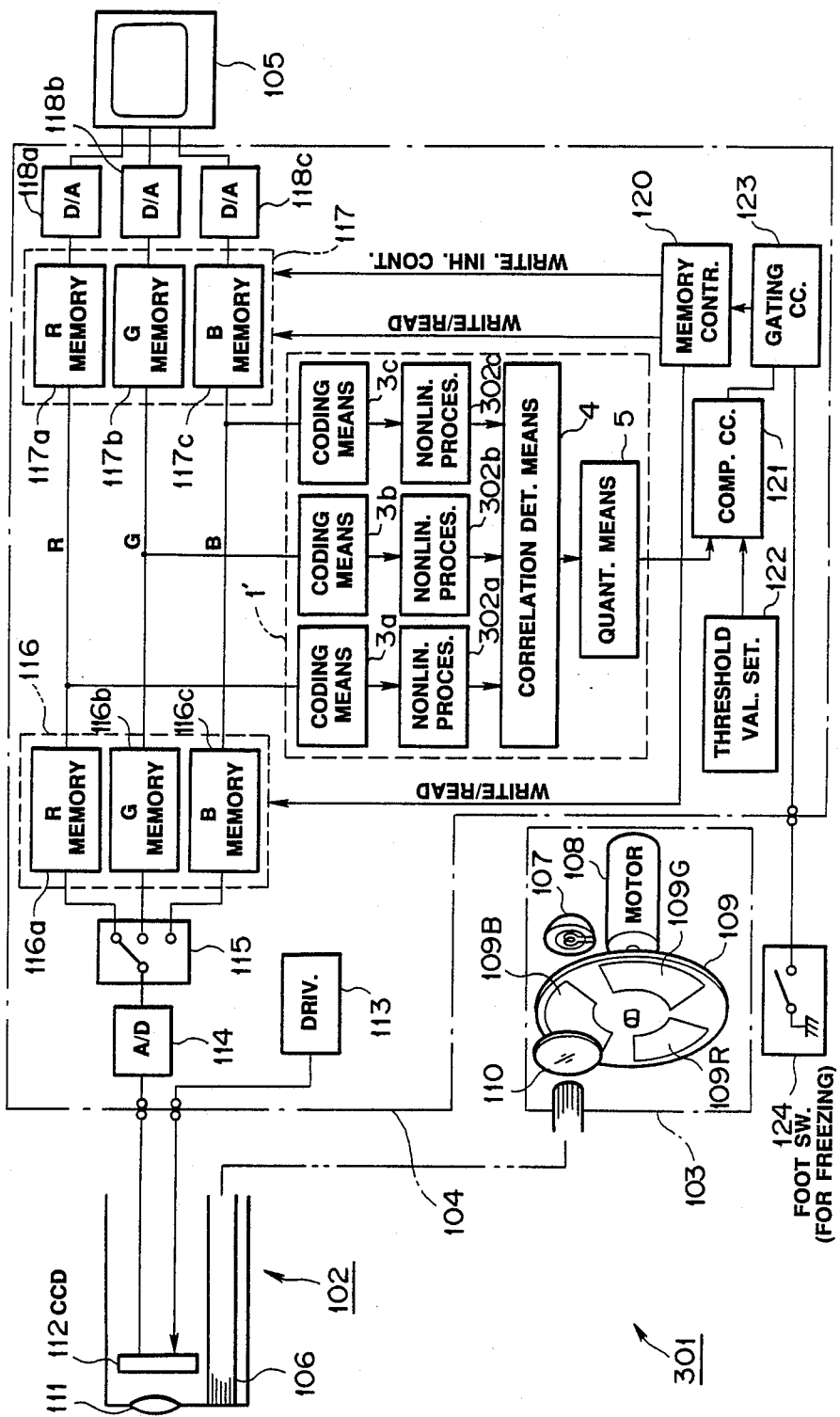
FIG. 18 is a formation diagram of an electronic endoscope apparatus of the third embodiment of the present invention.

FIG. 18 shows an electronic endoscope apparatus 301 of the third embodiment of the present invention.

This electronic endoscope apparatus 301 uses a different movement detecting circuit 1' in the apparatus 101 shown in FIG. 1.

Figure 19A:
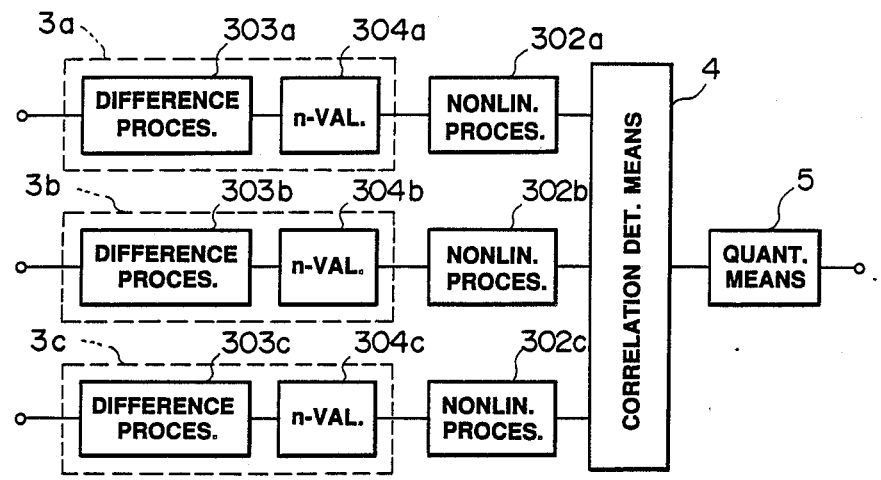
FIG. 19 is a basic formation diagram of a movement detecting circuit forming the apparatus of the third embodiment.

The formation of this movement detecting circuit 1' is shown in FIG. 19a. This circuit 1' is provided with non-linear processing means 302a, 302b and 302c suppressing low level regions between the correlation detecting means 4 and coding means 3a, 3b and 3c in the circuit 1 in FIG. 2.

Figure 19B:
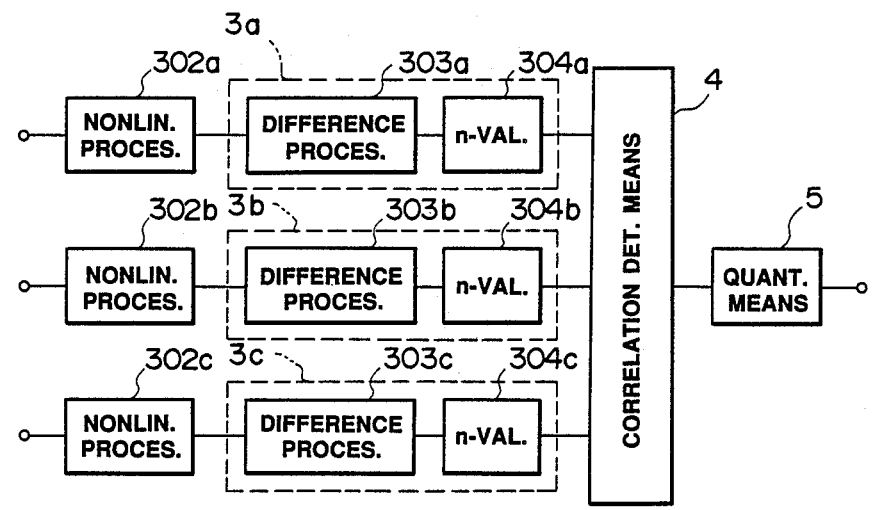

These non-linear processing means 302a, 302b and 302c may be provided in the front step of the correlation detecting means 4 or may be provided before the coding means 3a, 3b and 3c as in FIG. 19b.

The apparatus 301 of this third embodiment is different from the first embodiment only in the movement detecting circuit 1' but is of the same formation as of the first embodiment in the other formations.

By the way, in FIGS. 19a and 19b, the respective coding means 3i (i=a, b and c) are formed of difference processing circuits 303i and n-valuing circuits 304i.

The concrete formation of the movement detecting circuit 1' shall be explained in the following with reference to FIGS. 20 and others following it.

A movement detecting circuit 331 shown in FIG. 20 shows a concrete formation of a movement detecting circuit part on two digital input signals R and G. By the way, in FIG. 20, the movement detecting signal is output in an analogue quantity.

An input signal, for example, of 8 bits input from a first input and output end 332 is delayed by one sample cycle by a delay line 334 and is then input into a difference 8-bit-valuing processing circuit 335 and is input into the difference 8-bit-valuing processing circuit 335 without passing through the delay line 334.

As shown in FIG. 21, this difference 8-bit-valuing processing circuit 35 produces by a subtracter 336 a difference signal between an input signal R synchronized with the application of a clock CLK and a delayed input signal Rd. Therefore, as the input signal is of 8 bits, the difference signal can take a value in the range of −255 to +255. Next, by shifting down one bit, the LSB is removed and a value in a range of −127 to +127 is made. Further, a bias value 127 from a bias value producing circuit 337 is added by an adder 338 to make a value in a range of 0 to +254.

An 8-bit difference signal Ra of this difference 8-bit-valuing processing circuit 335 is applied to the address end of an ROM 341 having such non-linear input and output characteristics as are shown in FIG. 22. A signal read out by a chip sect signal RD is output to this ROM 341.

The input data shown in FIG. 22 are address data and, in case the input data are near the central value (+128)(corresponding to the case of a low level range in which the absolute value of the difference is small with respect to the input signals R and Rd as it is shifted by the bias value), the output signal will be compressed and, on the other hand, in case the absolute value of the difference is large (the input data are near 0 and near +255), the output signal will be extended and output.

In case a noise is included in the above mentioned input signal R or Rd, as the noise level is generally low and therefore the noise level in the difference signal is in a small range, when passed through the above mentioned ROM 341, the noise component will be suppressed and the signal Rd output from this ROM 341 will be signal data high in the S/N. The output signal Rd data of this ROM 341 are input into a multiplier 342.

On the other hand, the second input signal G is input into an input end 332', is processed in the same manner and is input into the multiplier 432. The signal processing system for this second input signal G is shown by attaching "'".

By the above mentioned multiplier 342, two difference signal data Rd and Gb output from the ROM's 341 and 241' are multiplied and a correlated quantity is detected by the multiplication.

That is to say, the strength of the correlation of two functions f(x) and g(x) are represented generally by the following formula:

$$a = \frac{\int f(x)\,g(x)\,dx}{\sqrt{\int f(x)^2\,dx} \cdot \sqrt{\int g(x)^2\,dx}} \quad (1)$$

On the other hand, the input signals R and G are already differentially processed by a difference processing (for example, by 303i in FIG. 19a) and the direct current level is canceled. Therefore, in the case of detecting an image of the least movement quantity within a fixed time (for example, two seconds). even if the denominator of the formula (1) is neglected, the movement detecting precision will not be substantially influenced.

Figure 23:
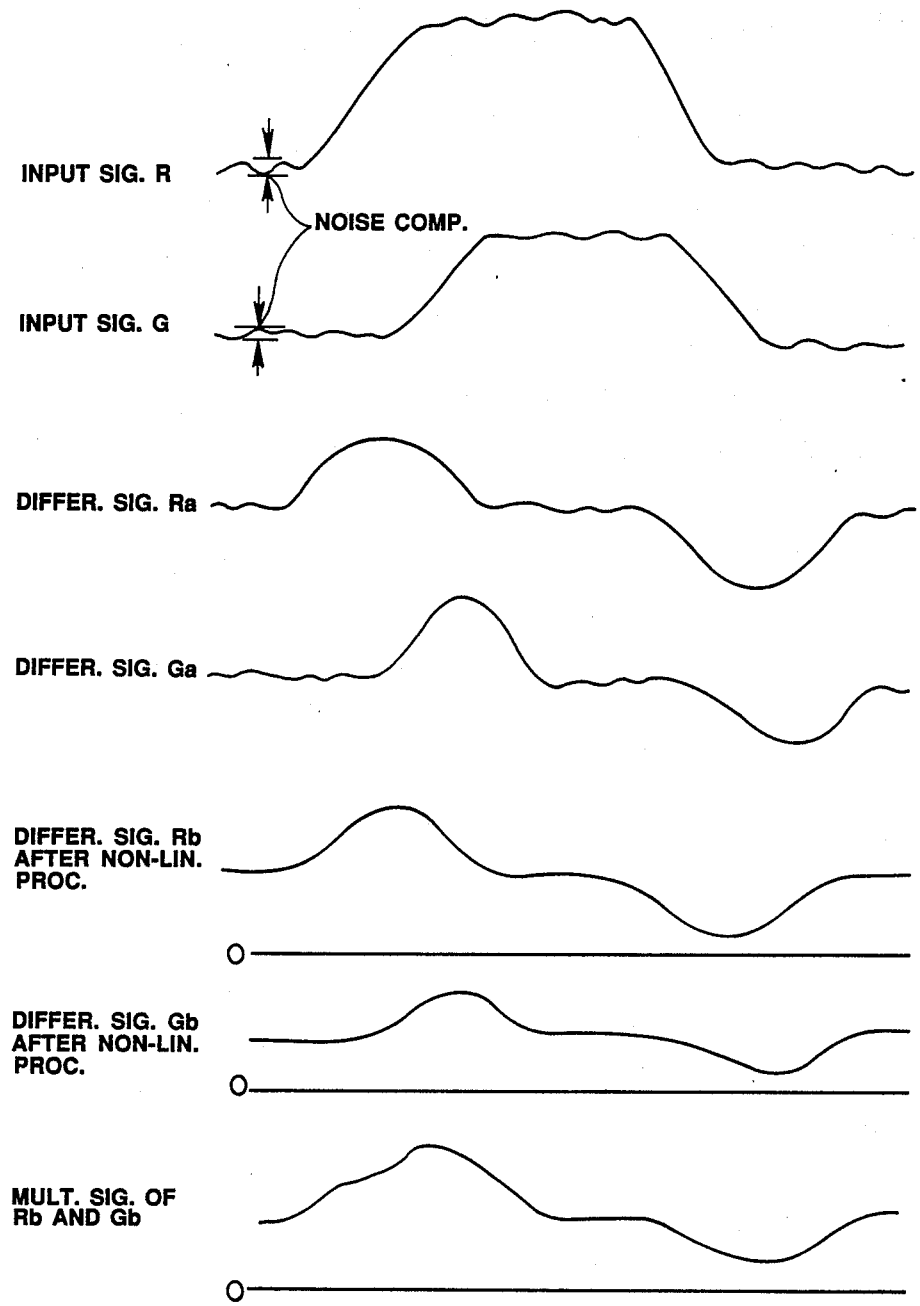
FIG. 23 is an explanatory diagram showing waveforms of the respective parts in FIG. 20.

Therefore, the correlation is determined by the product of the two difference signals Rb and Gb data by the multiplier 342. For example, a high speed digital multiplier of parallel 6 bits ×6 bits is used for this multiplier 342. The so far processed signal waveforms are shown in FIG. 23. As understood from this FIG. 23, after being processed to be non-linear, the input signals R and G containing noises are made difference signals Rb and Gb in which the noise components are suppressed and a correlation value little influenced by the noise components is determined by multiplying these difference signals Rb and Gb containing little noise components by the multiplier 342.

The correlation value between the sampling signal data as determined by the above mentioned multiplier 342 is converted to an analogue value by a D/A converter 343 and is then input into an integrating circuit 344. By this integrating circuit 344, the integration corresponding to the integration mark of the formula (1) is made and a movement detecting signal is output from an output end 345.

By the way, the multiplier 342 can control the multiplying operation by a multiplication enabling signal.

By the above series of signal processes, the correlation value of the input signals R and G is quantified, the movement detecting signal output through the integrating circuit 344 is processed to suppress the low level by the ROM's 341 and 341' and then the correlation value is detected. Therefore, the movement detecting signal is little influenced by noise componets and is high in the precision.

Figure 24:
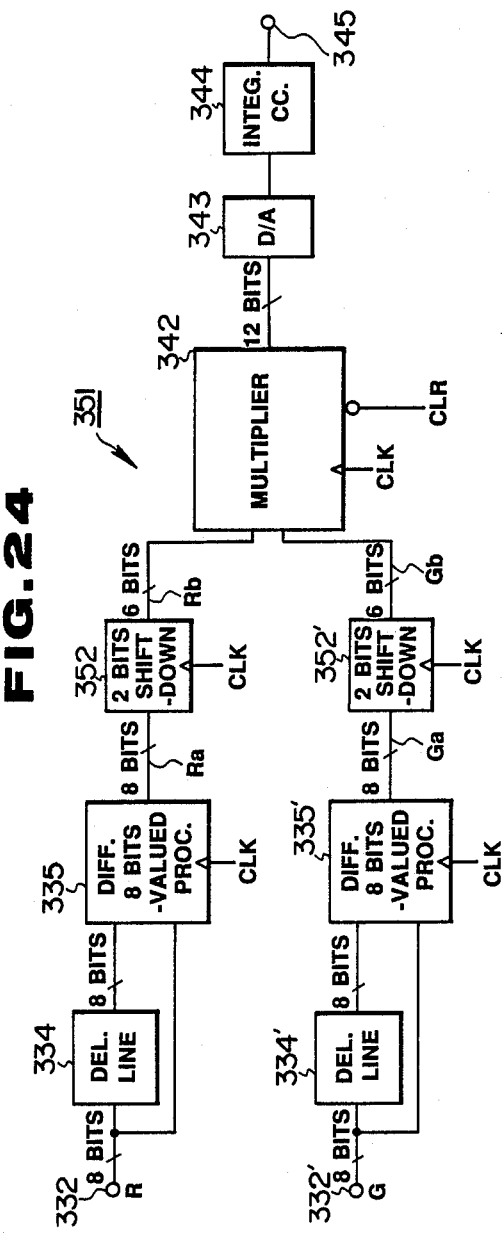
FIG. 24 is a formation diagram of a movement detecting circuit of a modification different from that of FIG. 20.

FIG. 24 shows a modification of the movement detecting circuit 331 of FIG. 20.

This movement detecting circuit 351 is to make a non-linear process by using 2-bit shift down circuits 352 and 352' instead of the ROM's 341 and 341' in the circuit 331 of FIG. 20. The others are of the same formation and are represented by the same reference numerals.

Figure 25B:
FIG. 25 is an operation explaining diagram of a 2-bit shift down circuit in FIG. 24.
Figure 25A:

In the above mentioned 2-bit shift down circuits 352 and 352', the input signal of 8 bits is shifted down by two bits so as to be converted to be of 6 bits. That is to say, the signal data input with 8 bits as shown in FIG. 25a are shifted down by 2 bits and are output with only 6 bits on the upper bit side as shown in FIG. 25b. This 2-bit shift is made by the application of a clock CLK by using a shift register.

This modification can be realized with a formation simpler than of the circuit 331 shown in FIG. 20 and can make a movement detection little influenced by the noise.

The 2-bit shift down may be made as in FIG. 26 without using the above mentioned shift register.

This non-linear processing circuit 361 can be used for the 2-bit shifting circuits 352 and 352' in FIG. 24a and upper 6 bits at an output end of a difference 8-bit making processing circuit 335 (or 335') are input into a multiplier 342.

That is to say, in this modification, the non-linear process can be made by only the manner of wiring the difference 8-bit making processing circuits 335 and 335' and the multiplier 342 and therefore a movement detecting circuit simple in the formation and proof against noise can be realized.

FIG. 27 shows further another movement detecting circuit 371.

In this embodiment, for example in the embodiment shown in FIG. 20, ROM's 372 and 372' of an inverse $\gamma$ characteristic are provided in the front steps of delay lines 334 and 334' so that input signals R and G may be applied to the address ends of the respective ROM's 372 and 372'.

Figure 28:
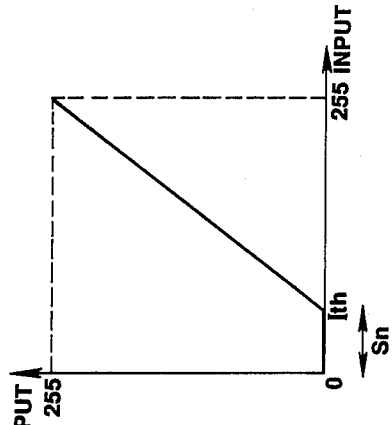
FIGS. 28 and 29 are characteristic diagrams showing input and output characteristics of the ROM of FIG. 27.

The ROM's 372 and 372' are set to be of such inverse $\gamma$ input and output characteristic as is shown by a solid line made by folding back a dotted line showing a $\gamma$ characteristic on a straight line inclined by 45 degrees in FIG. 28. Therefore, the input signals R and G having the $\gamma$-characteristic and input respectively into the ROM 372 and 372' are converted to be of a linear characteristic and are output to the next step side.

In an image in which, for example, a dark part and a bright part exist as mixed, so far, the dark part has overwhelmingly contributed to the correlation value and the precision of the movement detection has not been always high, whereas, in this embodiment, the dark part and bright part evenly contribute to the correlation value and therefore the movement can be detected precisely.

Figure 29:
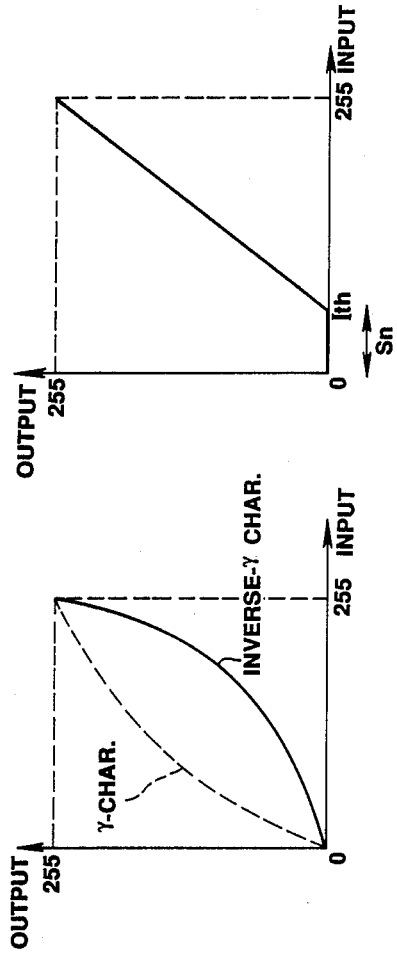

By the way, in this embodiment, the above mentioned ROM's 372 and 372' are set to be of an inverse $\gamma$ input and output characteristic but, as shown in FIG. 29, the input level from the 0 level to the threshold value Ith may be made a noise removing region Sn and such input and output characteristic that the output may be 0 for the input signal below this threshold value and a linear input and output relation may be shown for the input level above the threshold value may be set. That is to say, the movement may be detected at a high Precision with little influence of noises by clipping and, removing the low level noises extended by the $\gamma$ characteristic.

Also, the 2-bit shift down circuit used in the embodiment in FIG. 24 or its modification may be used instead of the above mentioned ROM's 372 and 372'. That is to say, the same operation and effect as of this embodiment can be obtained by removing the dark part or noises extended by the $\gamma$ characteristic with the 2-bit shift down circuit.

In the above mentioned respective embodiments, the input signals R and G may be two signals forming one image, may be two of frame sequential R, G and B signals, for example, in an electronic endoscope apparatus and also may be of these frame sequential R, G and B signals as converted to color difference signals by a matrix circuit. Also, this embodiment can be used instead of the movement detecting circuit 41 in the apparatus 201 shown in FIG. 11.

Figure 30:
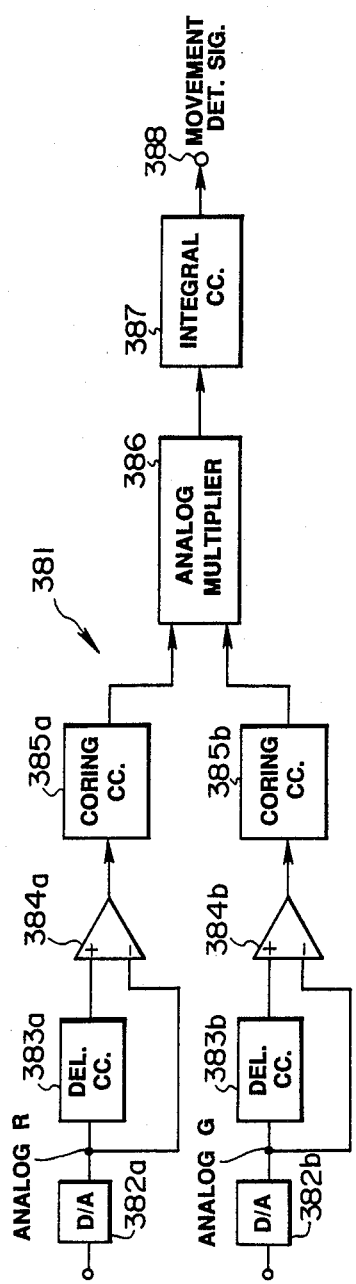
FIG. 30 is a formation diagram of a movement detecting circuit formed of an analogue processing system.

In the above described embodiment, the movement detecting circuit is made at least for a digital input signal but can be formed of an analogue circuit as shown in FIG. 30.

An analogue color signal R converted by a D/A converter 382a is input into a delaying circuit 383a formed of an inductance L and capacitance C, is delayed here for a fixed time corresponding to one pixel part or a plurality of pixel parts of an imaging device and is then input into a differential amplifier 384a.

Figure 31:
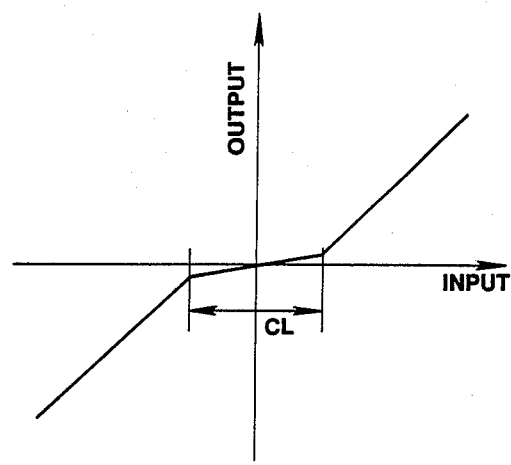
FIG. 31 is a characteristic diagram showing input and output characteristics of a coring circuit in FIG. 30.

A difference between the signal delayed by the delaying circuit 383a and the non-delayed signal is determined by this differential amplifier and is input into a coring circuit 385a in the next step. This coring circuit 385a is of such input and output characteristic as compresses the output level for an input signal of an amplitude below the coring level CL as shown in FIG. 31. Therefore, the difference signal has the signal of the low level, that is, in the low level region likely to be influenced by noise suppressed and is input into an analogue multiplier 386.

In the same manner, an analogue color signal G converted by a D/A converter 382b is delayed for a fixed time in a delaying circuit 383b and is input into a differential amplifier 384b. A difference between this delayed signal and the non-delayed is detected. This difference signal has the signal component in the low level region suppressed in a coring circuit 385b of the characteristic shown in FIG. 31 and is input into the analogue multiplier 386. By the way, the color signals R and G are synchronized signals.

A multiplied value of the difference signal of the color signal R and the difference signal of the color signal G is determined by the above mentioned analogue multiplier 386, is integrated for one frame/field period by an integrating circuit 387 and is output from an output end 388 as a movement detecting signal for an image formed of the color signals R and G.

In FIG. 30, the movement is detected on the synchronized color signals R and G but the signals utilizable for the movement detection are not limited to this combination but color signals R and B or G and B may be used.

Further, a color signal I (I=R, G or B) and a signal made by delaying this signal by one frame/field can be used. Also, a luminance signal y and a luminance signal delayed by one frame/field may be used. A color difference signal R-Y or B-Y may be used instead of the luminance signal.

In the above described respective embodiments, the movement is detected for the entire respective images. However, an electronic endoscope apparatus 511 provided with a means of detecting a movement in a region to be noted or a part (mentioned as a concerned region hereinafter) which the observer wants to observe with concern) shall be explained in the following.

Figure 34:
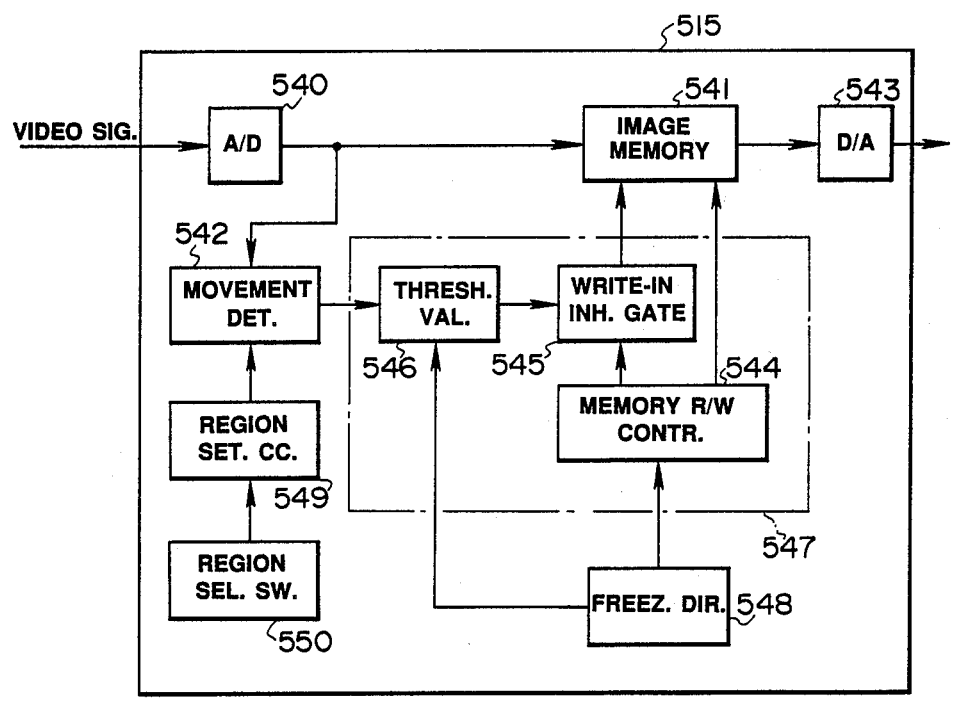
FIG. 34 is a formation diagram of an image freezing circuit in the fourth embodiment.

As shown in FIG. 34, this electronic endoscope apparatus 511 is characterized by comprising a movement detecting circuit 501 for detecting the movement quantity of the image from an input image signal and outputting a movement detecting signal, a detecting region setting means 502 for setting a region for detecting the movement by controlling the movement quantity operating action and a detecting region designating means 503 for designating a variable detecting region for this detecting region setting means 502 and designating the detecting region.

A still picture particularly little in the image movement is obtained in the concerned region by detecting the movement in the above mentioned region.

The formation of the electronic endoscope apparatus 511 shall be explained in the following with reference to FIG. 32.

Figure 32:
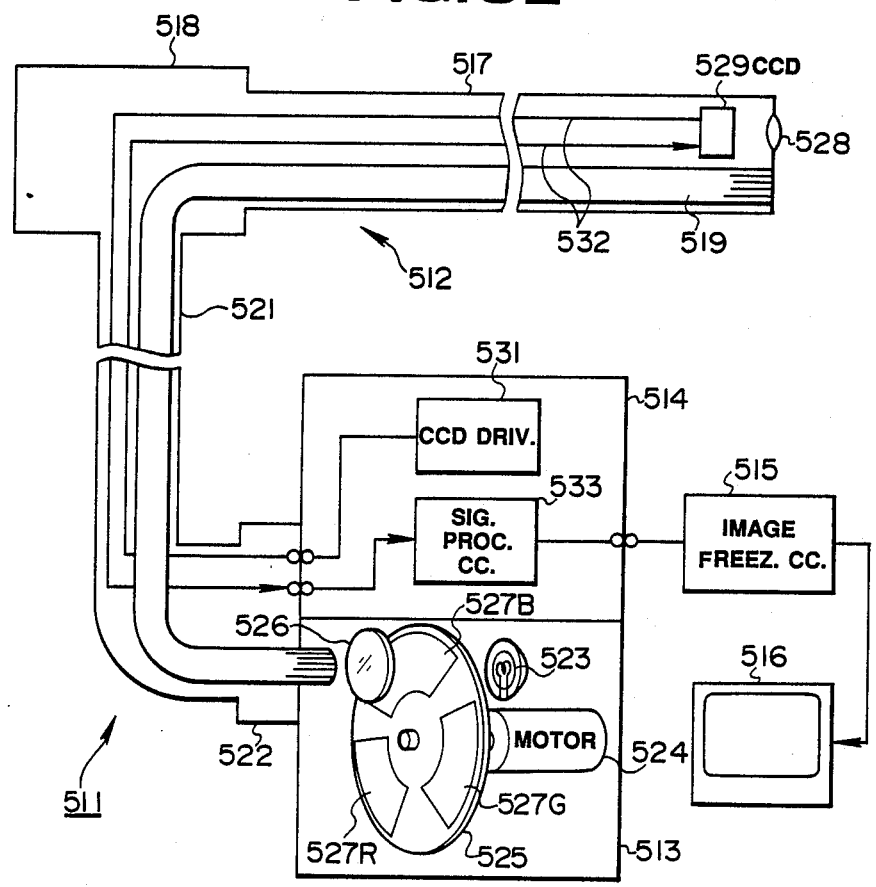
FIG. 32 is a formation diagram of an electronic endoscope apparatus of the fourth embodiment of the present invention.
Figure 33:
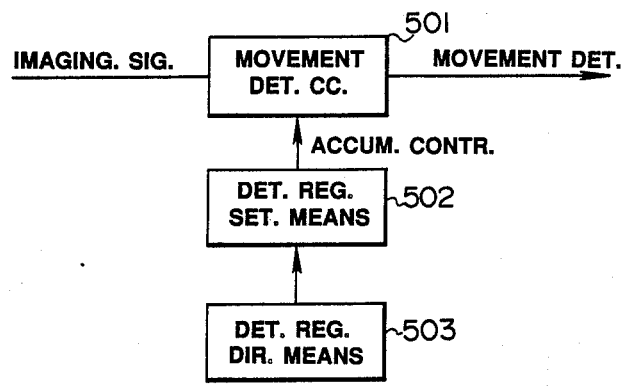
FIG. 33 is an explanatory diagram showing that the fourth to seventh embodiments have a movement detecting region setting means part.

As shown in FIG. 32, an endoscope imaging apparatus 511 of the fourth embodiment comprises an electronic scope 512, a light source unit 513 for feeding an illuminating light to this electronic scope 512, a video processor 514 for processing signals for the electronic scope 512, an image freezing circuit 515 for being able to memorize as a still picture a video signal output from this video processor and a color monitor 516 for displaying a video signal output from this image freezing circuit 515.

The above mentioned electronic scope 512 has an elongate insertable part 517 and a thick operating part 518 formed at the rear end of this insertable part 517.

A light guide 519 for transmitting an illuminating light is inserted through the above mentioned insertable part 517 and is further inserted through a universal cord 521 extended out of the operating part 518. A connector 522 at the end of this universal cord 521 can be fitted to the light source unit 513 and video processor 514.

By fitting this connector 522, the illuminating light of the light source unit 513 is fed to the entrance end surface of the light guide 519.

That is to say, a white color light of a lamp 522 is passed through a rotary color filter 525 rotated by a motor 524 and is then radiated to the entrance end surface of the light guide 519 through a condenser lens 526.

Three sector apertures are provided in the peripheral direction of the above mentioned rotary color filter 525 and are fitted respectively with red, green and blue color transmitting filters 527R, 527G and 527B. Therefore, lights of respective wavelengths of red, green and blue are sequentially fed to the light guide 519, are transmitted by this light guide 519 and are emitted forward from an emitting end surface fitted to the tip of the insertable part 517. An image of an object illuminated by the illuminating lights emitted from this end surface is formed on a CCD 529 arranged in the focal plane of an objective lens 528 fitted to the tip part by this objective lens, is photoelectrically converted by this CCD 529 and is stored as an electric charge.

The charge is read out by applying a driving signal output from a CCD driving circuit 531 of the video processor 514 through a signal line 532, is input into a signal processing circuit 533 within the video processor 514, is processed to be a standard video signal, for example, a composite video signal and is input into an image freezing circuit 515.

The formation of this image freezing circuit 515 is shown in FIG. 34. The input video signal is digitalized through an A/D converter 540 and is input into an image memory 541 and also into a movement detecting circuit 42. The output signal from this image memory 541 is D/A-converted in a D/A converter 543, is made an analogue video signal and is then input into a color monitor 516.

The writing/reading of the digital image (video) data into/out of the above mentioned image memory 541 is controlled by a freezing controlling means 547 formed of a memory R/W controller 544, writing-in inhibiting gate 545 and threshold value circuit 546.

The above mentioned memory R/W controller 544 and threshold value circuit 546 are connected with a freezing directing means 548 to give a freezing directing signal.

A movement detecting quantity (movement detecting signal) of a movement detecting circuit 542 for operating and outputting a movement quantity from the input video signal is input into the above mentioned threshold value circuit 546. This movement detecting circuit 542 is connected with a (detecting) region setting circuit 549 and is controlled to operate the movement detection only within a predetermined region.

The movement detecting circuit 331 shown, for example, in FIG. 20 can be used for the above mentioned movement detecting circuit 542.

In FIG. 20, as two digital color signals R and G must be synchronized, a field memory for delaying by one field period will be required in front of one input end 332 or 332'.

In case the above mentioned movement detecting circuit 331 is used, in order to detect the movement only within the concerned region, a multiplication enabling terminal MEN, for example, of the multiplier 342 in FIG. 20 may be controlled. Also, a D/A coversion enabling terminal (not illustrated) of the D/A converter 343 may be controlled. The movement detecting circuits shown in FIGS. 24 and 27 can be also used.

In the above mentioned region setting circuit 549, a plurality of movement detecting regions are prepared so as to be able to be swithced by a region selecting switch 550.

FIG. 35 shows an example of the formation of the above mentioned region setting circuit 549.

This region setting circuit 549 is formed of a ROM 551 and binary counter 552. A signal fs of the frequency sampling the input image is given to a clock input end CLK of the counter 552 and a vertical synchronizing signal VD is applied to a clear terminal CLR.

That is to say, this counter 552 counts per pixel and outputs binary data cycling in one field. These data are applied to lower addresses (Dl/Dn) of the ROM 551.

In this ROM 551, by memorizing as data of one bit whether the movement detecting operation per pixel is good or not as shown in FIGS. 36a or 36b, an operation inhibiting/allowing control signal can be obtained.

By preparing a plurality of such region settings, the region can be selected by a region selecting signal switching the upper addresses (Dn+1 to Dn+m).

The operation of this fourth embodiment shall be explained in the following with reference to FIG. 34.

In case a freezing direction by the freezing directing means 548 is not given, a freezing controlling circuit 547 will control an image memory 541 to write in sequentially input image data and to sequentially read out the image data written in. By this control, image data of a moving image will be output from the image memory 541 and the moving image will be displayed in the color monitor 516 through a D/A converter 543.

When freezing is directed, a threshold value circuit 6 will operate to compare the reset reference value and the movement detecting operation output value within the region optionally selected by the observer by a region selecting switch 550 with each other.

In case the movement detecting (output) value exceeds the reference value, the movement of the object will be judged to be large and the threshold value circuit 546 will send a writing inhibiting signal to a writing inhibiting gate 545. By this writing inhibiting signal, the writing controlling signal output to the image memory 541 through the writing inhibiting gate 545 from a memory R/W controller 544 will be made inoperative and, after this controlling signal, the image data will not be renewed in the image memory 541 and a still picture will be held, will be repeatedly read out and will be displayed in the color monitor 516.

In this fourth embodiment, the movement detection in the region desired by the observer can be made by the region selecting switch 550.

Therefore, in case there is a part noted by the observer, if this part is selected by the region selecting switch 550 so as to be a movement detecting region, a still picture little in the image movement will be able to be obtained. (On the other hand, in case the movement is detected in the entire region, even if there is any movement in the noted part, in case it is not so large on the entire image, a still picture will be memorized.)

That is to say, in the fourth embodiment, particularly in case there is a noted part, a clear still picture little in the image movement will be able to be obtained for that part and will be very effective to a diagnosis. Also, by setting the movement detecting region in the range narrower than the entire image, there is an advantage that the time taken to detect the movement can be made short.

By the way, in the fourth embodiment, the image freezing circuit 515 is provided on the rear step side of the signal processing circuit 533 but may be provided on the front step side.

Figure 37:
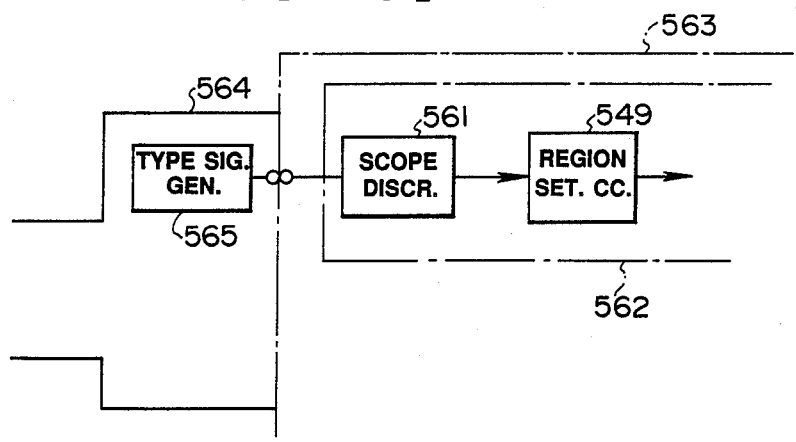
FIG. 37 is a block diagram of an essential part in the fifth embodiment of the present invention.

FIG. 37 shows an essential part of the fifth embodiment of the present invention.

In this embodiment, in the image freezing circuit 515 shown in FIG. 34 in the fourth embodiment, a scope discriminating circuit 561 is used instead of the region selecting switch 550 to form an image freezing circuit 562.

In this embodiment, the image freezing circuit 562 is provided within a video processor 563.

In the above mentioned scope discriminating circuit 561, when the connector 564 of the electronic scope is connected to the connector receptacle of the video processor 563, for example, a type signal generating circuit 565 built in this connector 564 will be electrically connected with the scope discriminating circuit 561 and this scope discriminating circuit 561 will output a region selecting signal selectig the region in response to this connected electronic scope.

Figure 38:
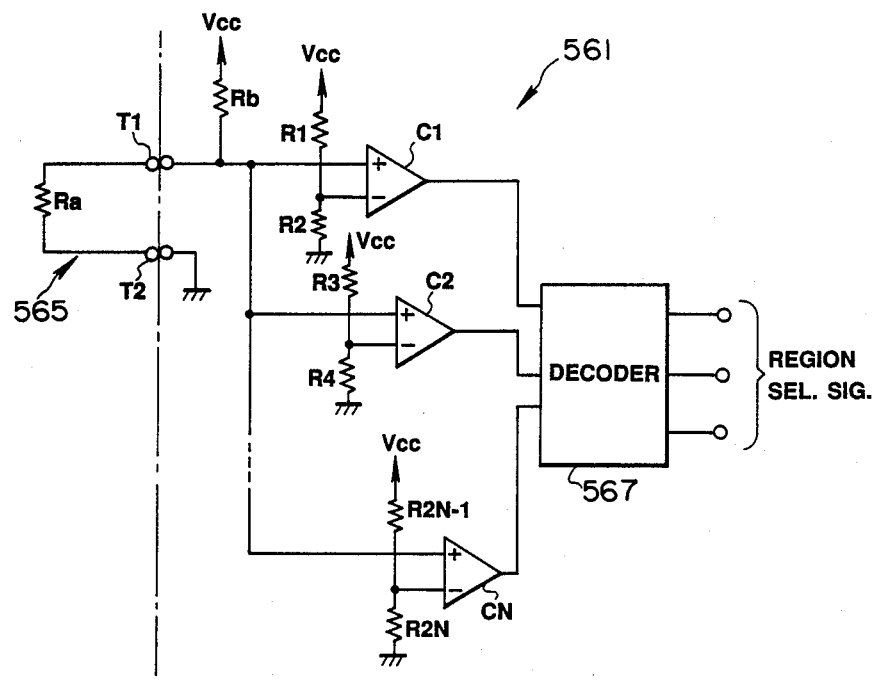
FIG. 38 is a circuit diagram of a scope discriminating circuit in the fifth embodiment.

The formations of the above mentioned type signal generating circuit 565 and scope discriminating circuit 561 are shown in FIG. 38.

Within the connector 564, a resistance Ra in response to the kind of the scope is connected between two terminals T1 and T2 to form the type signal generating circuit 565.

One of the terminals on the connector receptacle side connected with the above mentioned terminals T1 and T2 is earthed and the other is connected to a current source end Vcc through a resistance Rb. The voltage divided by the above mentioned resistances Ra and Rb is connected to one input end of each of N comparators C1, C2, . . . and CN.

Each of the respectively different voltages divided respectively by the resistances R1 and R2, R3 and R4, . . . and R2N−1 and R2N is applied to the other input end of each of the above mentioned respective comparators C1, C2, . . . and CN. The outputs of these comparators C1, C2, . . . and CN are input into a decoder 567 and the 2-valued outputs of these comparators C1, C2, . . . and CN are decoded to produce region selecting signals of m bits which are input into the ROM 551 shown in FIG. 35.

Therefore, if the above mentioned resistance Ra is determined in response to the kind of the scope, the outputs of the respective comparators C1, C2, . . . and CN will become a combination of outputs inherent to the kind of the scope and will be converted to a scope discriminating signal through the decoder 567 to be input into a region setting circuit 549.

Therefore, according to this embodiment, a movement detecting region can be automatically selected in response to the scope used for the observation and a frozen image little in the movement quantity can be obtained within the region.

Figure 39:
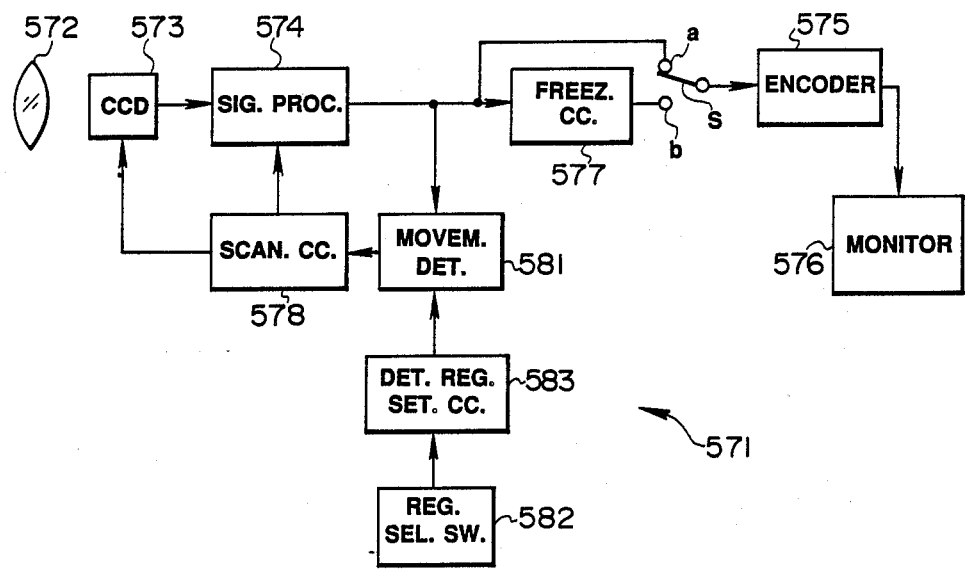
FIG. 39 is a block diagram of an essential part of the sixth embodiment of the present invention.

FIG. 39 shows an essential part of the sixth embodiment of the present invention. There is a charge coupled device (CCD) as one of solid state imaging devices as imaging means. This CCD is extensively used. This CCD in which a frame transfer (FT) system is used as a transfer system can vary the storing time, that is, the exposure period by controlling the timing of the transfer and is called an electronic shutter.

In this sixth embodiment, an electronic endoscope apparatus 571 provided with a variable electronic shutter is formed.

In FIG. 39, an optical image of an object is formed on the imaging surface of a CCD 573 by an imaging optical system 572 and is converted to an electric signal by this CCD 573. This signal is input into a signal processing circuit 574 and is processed to be demodulated and amplified. The output of this signal processing circuit 574 is input into an encoder 575 through a switch S, is converted to a video signal and is displayed as a moving image in a color monitor 576.

The output of the above mentioned signal processing circuit 574 is input also into a freezing circuit 577 and a frozen picture can be also displayed by passing the output through this freezing circuit 577.

The driving signal of the above mentioned CCD 573 and the timing signal of the signal processing are produced by a scanning circuit 578.

Further, the output of the signal processing circuit 574 is input into a movement detecting circuit 581, the movement quantity is detected and this output is input into the scanning circuit 578.

In the above mentioned movement detecting circuit 581, the movement detection is operated and controlled within the region of a detecting region setting circuit 583 selected by a region selecting switch 582.

Figure 40:
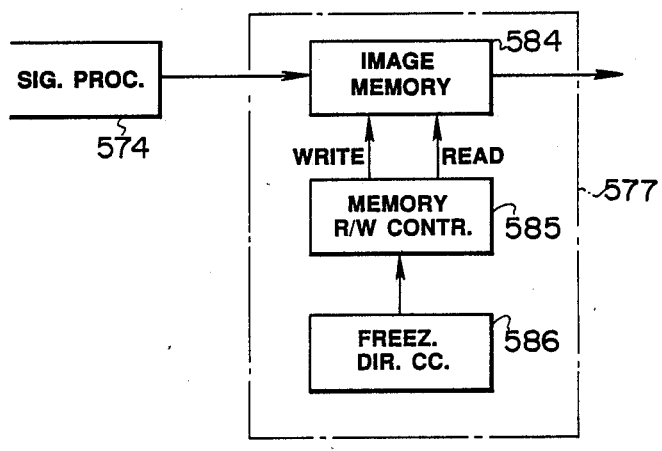
FIG. 40 is a block diagram of a freezing circuit in the sixth embodiment.

By the way, as shown in FIG. 40, the above mentioned freezing circuit 577 comprises an image memory memorizing an image, a memory R/W controller 585 controlling the writing and reading the image into and out of this image memory 584 and a freezing directing circuit 586 outputting a freezing signal inhibiting the writing in.

The operation of this embodiment shall be explained in the following.

The movement detecting circuit 581 is always detecting the movement within the region selected by the region selecting switch 582 and set by the detecting region setting circuit 583. The detected movement quantity is input into the scanning circuit 578 which has a variable electronic shutter controlling the timing of the frame transfer of the CCD 573 and controlling the exposure period with the detected movement quantity.

That is to say, in case the movement of the object is large, the timing of the frame transfer will be made earlier to shorten the exposure period and, on the contrary, in case the movement detected quantity is small, the exposure period will be controlled to be longer.

In order to start the storing time at a fixed timing to renew the image as synchronized with the video signal of the output, it is necessary to erase the unnecessary charges produced by the exposure until the start of storing the next image to be frame-transferred. Therefore, in the scanning circuit 578 of this embodiment, the second frame transfer is made just before the next storing starts and then a quasi-scanning signal is generated at a high speed to erase the above mentioned unnecessary charges. Further, the gain is controlled in the signal processing circuit 574 to prevent the brightness of the image from varying with the variation of the storing time.

Therefore, there can be realized an electronic endoscope apparatus whereby, for example, if the switch S is set on the contact a side, when the movement quantity of the object is large in the observer concerned region, an image reduced in the image movement will be obtained and, when the movement quantity is small, the output of the CCD 573 will be increased, the N/S will be improved and a high quality moving image will be able to be obtained.

Also, if the switch S is set on the contact b side, a frozen image little in the movement quantity in the concerned region will be able to be obtained. It is a feature that, in such case, the image at the time when the freezing is directed by the freezing directing circuit 586 will be frozen. (It is a feature that, in the fourth embodiment, not only the movement of the image but also the color movement in a color frame sequential imaging system can be coped with.)

By the way, the fifth embodiment can be applied to this embodiment.

That is to say, the region selecting switch 582 in FIG. 39 can be replaced with the formation shown in FIG. 37. In such case, the movement detecting region in the control of the exposure period can be automatically selected in response to the kind of the scope to be used for the observation.

By the way, the output of the signal processing circuit 574 may be input directly into the encoder 575 without providing the switch S or the output of the signal processing circuit 574 may be input into the encoder 575 through the freezing circuit 577.

Figure 41:
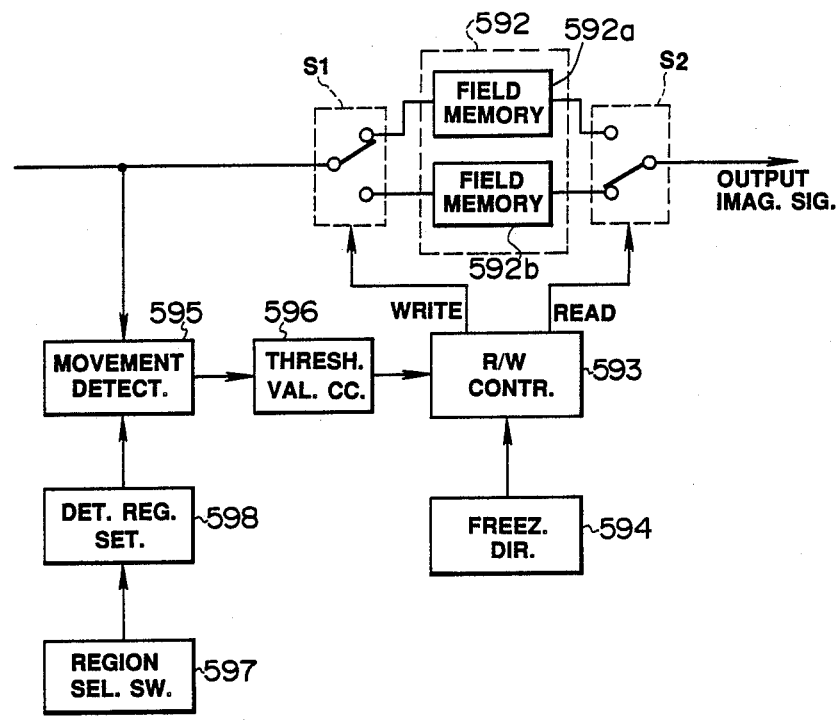
FIG. 41 is a block diagram showing an essential part of the seventh embodiment of the present invention.

FIG. 41 shows an image freezing circuit part in the seventh embodiment of the present invention.

This embodiment has a frame freezing mode freezing by a frame unit, that is, by a two-field unit to take the resolution to be usually high. However, in this frame freezing, in case a quick moving object is frozen, a flicker will be produced by the difference of the two-field image. Therefore, in such case, it is desirable to switch to a method wherein the image is frozen by a field unit and the same image is displayed in two fields, that is, to a field freezing mode. In this case, as it is toilsome or complicated to switch the frame freezing and field freezing to each other, in this embodiment, this switching is made automatically. Also, in this embodiment, it is a feature that the movement detecting region is variable as described above.

In FIG. 41, an image signal to be input is written by one field alternately into two first and second field memories 592a and 592b through a switch S1. Also, while the image signal is being written into one field memory (for example, 592a), it will be read out of the other field memory (in this case, 592b) so that the image of one field will be read out alternately and the image signal of a moving picture will be outut as an output image signal.

An R/W controller 593 is provided to control the writing into and reading out of the above mentioned field memories 592a and 592b so that a freezing directing signal from a freezing directing circuit 594 for freezing may be input into this controller 593.

Also, the input image signal is input into a movement detecting circuit 595, the movement quantity is detected and the output is input into a threshold value circuit 596 and is compared with a reference value. The result of the comparison with this reference value is input into the R/W controller 593.

The above mentioned movement detecting circuit 595 controls the detecting region in which the movement is detected through a detecting region setting circuit 598 selected by a region selecting switch 597.

The operation of this embodiment shall be explained in the following.

The same as in the sixth embodiment, the movement detecting circuit 595 always detects the movement within the region selected by the observer and outputs the detected quantity to the threshold value circuit 596.

This threshold value circuit 596 compares the input movement detected quantity and the predetermined reference value with each other and outputs the result to the R/W controller 593. When freezing is directed by the freezing directing circuit 594, the R/W controller 593 will control the image memory 592 to make a field freezing in case the movement detected quantity is judged to be above the reference value by the threshold value circuit 596 and to make a frame freezing in case it is judged to be below the reference value.

That is to say, after the writing operation is inhibited, in the field freezing, the reading out is made over two fields from only one of the field memories 592a and 592b and a freezing image signal for one frame is output. On the other hand, in the frame freezing, the reading out is made for each field from both field memories 592a and 592b and a freezing image signal for one frame is output.

According to this seventh embodiment, the freezig mode optimum to the movement of the object part in the concerned region can be automatically selected and a frozen image little in the image movement can be obtained for the concerned region.

By the way, in this embodiment, too, the scope discriminating circuit 561 shown in FIG. 37 may be used instead of the region selecting switch 597 as a detecting region directing means to automatically set the movement detecting region by the scope to be used.

The electronic endoscope apparatus for obtaining a still picture in response to the requirement of the user shall be explained in the following.

Figure 42:
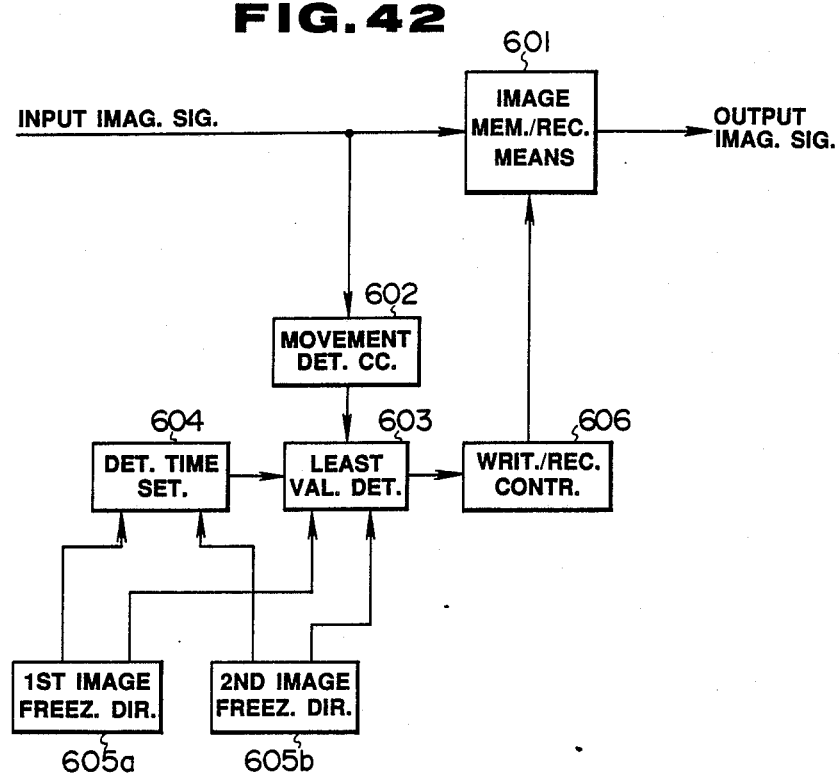
FIG. 42 is a schematic formation diagram of an essential part in the eighth embodiment of the present invention.

The schematic formation of an essential part of this electronic endoscope apparatus is shown in FIG. 42.

This electronic endoscope apparatus comprises an image memorizing/recording means 601 for memorizing or recording an input image signal, a movement detecting means 602 for detecting the movement of an object from the above mentioned image signal, a least value detecting means 603 for detecting the least value of the movement quantity of the object from the above mentioned movement detecting means 602, a detecting time setting means 604 for optionally setting the operating time of the above mentioned least value detecting means 603, a first and second image freezing directing means 605a and 605b for directing to freeze the image by starting the above mentioned least value detecting means 603 and the above mentioned detecting time setting means 604 and a writing/recording controlling means 606 for controlling the above mentioned input image signal writing operation and recording operation for the above mentioned image recording/memorizing means 601 on the basis of the least value from the abve mentioned least value detecting means 603.

The input image signal is input into the movement detecting means 602 and the movement quantity of the object is detected from this input image signal and is transmitted to the least value detecting means 603. By the directing signal from the image freezing directing means 605a or 605b selected by the user, the above mentioned least value detecting means 603 is started and the detecting time by the detecting time setting means 604 is set. The image signal of the least movement quantity within the range of the detecting time by this detecting time setting means 604 is detected by the least value detecting means 603. The least value detected by the least value detecting means 603 is applied to the writing/recording controlling means 606 and the writing and recording of the input image signal into the memorizing/recording means 601 is controlled by this writing/recording controlling means 606. By the above operation, the detecting time by the least value detecting means 603 is set by the detecting time setting means 604 for the input image signal and the image signal of the least movement quantity within the set time is memorized or recorded.

Now, an electronic endoscope apparatus of the eightth embodiment provided with the function of FIG. 42 shall be explained in the following.

Figure 43:
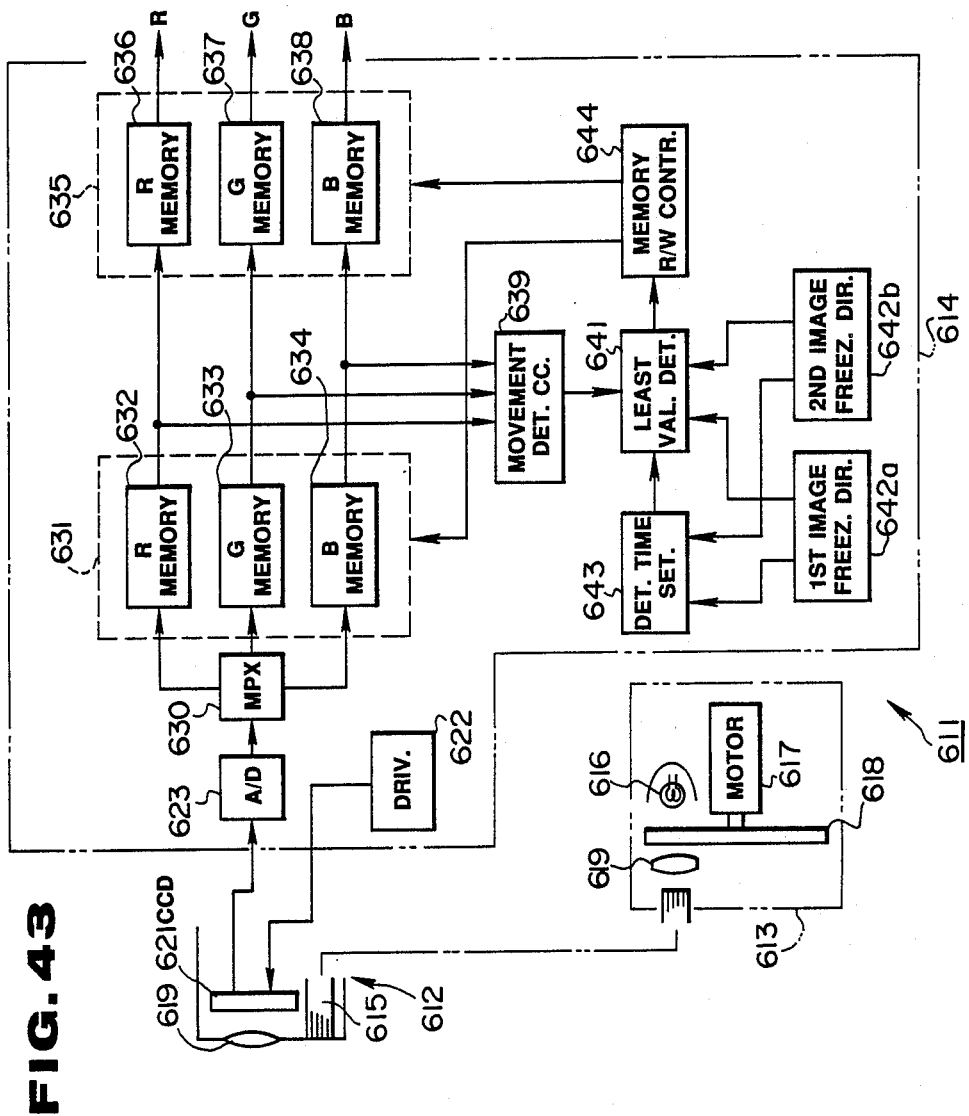
FIG. 43 is a formation diagram of an electronic endoscope apparatus of the eighth embodiment.

FIG. 43 shows an electronic endoscope apparatus 611 of a frame sequential imaging system.

This apparatus 611 comprises an electronic scope 612 having a frame sequential type imaging means built-in, a frame sequential type light source unit 613, an image freezing signal processing apparatus 614 for the electronic scope 612 and a displaying apparatus not illustrated.

In the above mentioned electronic scope 612, a light guide 615 is inserted through an elongate insertable part and is connected to the light source unit 613 to feed a frame sequential light from the light source unit 613.

In this light source unit 613, a white color light of a lamp 616 is passed through a rotary color filter 618 rotated by a motor 617 and fitted with red, green and blue color transmitting filters in the form of sectors to be made red, green and blue frame sequential lights which are radiated to the entrance end surface of the light guide 615 through a condenser lens 619.

The lights are transmitted by this light guide 615 and are radiated toward a forward object from the exit end surface of the tip of the insertable part. The image of the illuminated object is formed on a CCD 621 by an objective lens 619 fitted to the tip part of the insertable part. This CCD 621 photoelectrically converts the optical image. The image signal is read out by a driving signal output from a CCD driving circuit 622, is made a digital color frame sequential signal by an A/D converter 623 and is memorized in an R memory 632, G memory 633 and B memory 634 within a synchronizing memory part 631 in response to the respective colors through a multiplexer 630. The image signals memorized in the above mentioned R memory 632, G memory 633 and B memory 634 are read out with the respective color signals synchronized and are sequentially written respectively into an R memory 636, G memory 637 and B memory 638 within a freezing memory part 635 as color frame synchronized signals. The R, G and B image signals written into the respective memories within this freezing memory part 635 are synchronized with synchronizing signal of a displaying apparatus or processing apparatus not illustrated connected to the rear step and are sequentially read out.

The color frame synchronized signals read out of the above mentioned synchronizing memory part 631 are simultaneously transmitted also to a movement detecting circuit 639 and the movement quantity of the object is detected by this movement detecting circuit 639 and is transmitted to a least value detecting circuit 641.

Here, when an image freezing directing signal is issued by a first or second image freezing directing circuit 642a or 642b, a detecting time setting circuit 643 and least value detecting circuit 641 will start. This detecting time setting circuit 643 sets the least value detecting time corresponding to the first or second image freezing directing circuit 642a or 642b.

Also, the above mentioned least value detecting circuit 641 detects the least value of the movement quantity within the time set by the above mentioned detecting time setting circuit 643. The image data of the image signal judged to be the least in the movement quantity are held in the freezing memory part 635 and a detecting signal is transmitted to a memory R/W controller 644 to output the held image data.

For example, the movement detecting circuit 1 in FIG. 1 can be used for the movement detecting circuit 639 in this embodiment. The output of this movement detecting circuit 639 is input into the least value detecting circuit 641 and the least value is detected.

Figure 44:
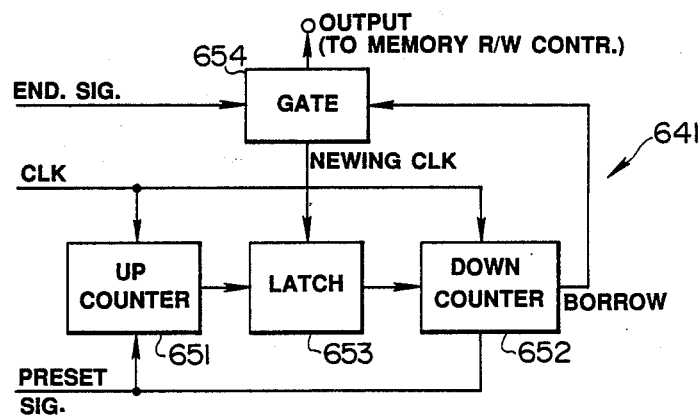
FIG. 44 is a formation diagram of a least value detecting circuit.

The formation of this least value detecting circuit 641 is shown in FIG. 44.

This least value detecting circuit 641 comprises an up counter 651 and down counter 652 counting clocks by the movement quantity by making the subsequent vertical synchronizing signal a preset signal by a freezing directing signal from a freezing directing circuit 642a or 642b, a latch 653 holding the output of this up counter and a gate circuit 654 transmitting a renewing clock to this latch 653 and outputting an image freezing controlling signal to a memory R/W controller 644.

In case a borrowed signal is input from the down counter 652, this gate circuit 654 will not output a renewing clock.

Also, this gate circuit 654 can control the memory controller 644 to hold the freezing state by the signal from the detecting time setting circuit 643. That is to say, the least value detecting circuit 641 is operated by the freezing directing circuit 642a or 642b and then, after the time set in response to the freezing directing circuit 642a or 642b by the detecting time setting circuit 643, when an ending signal ending the least value detecting operation is input into the gate circuit 654, the gate circuit 654 will continue to output a freezing controlling signal.

When a freezing directing signal is output from the freezing directing circuit 642a or 642b, the respective counters 651 and 652 of the least value detecting circuit 641 will be set by a preset signal so that the up counter 651 may be all Low (0) and the down counter may be all Hi(1) and the number of the movement quantity will be counted.

Each of the counters 651 and 652 can count a number larger than the largest value of the movement quantity and therefore, even if the counting ends, no carrying or borrowing from the respective counters 651 and 652 will occur. Also, so that no borrowing may occur from the down counter, the gate circuit 654 transmits a renewing clock to the latch 653 to latch the output of the up counter. The gate circuit 654 transmits a controlling signal to the memory R/W controller to freeze an initial value image.

When the next movement quantity is detected, by a preset signal, the up counter 651 will be Low (0) and the down counter 652 will receive the previous output value of the up counter 651 from the latch 653 to be a preset value. When each of the counters 651 and 652 counts the number of movement quantities and the movement quantity is larger than the previous movement quantity, the down counter 652 will generate borrowing, the gate circuit 654 will output no renewing clock and therefore the previous value will become a next preset value of the down counter 652.

On the other hand, if the movement quantity is smaller than the previous movement quantity, the down counter 652 will not generate borrowing, a renewing clock will be output by the gate circuit 654 and the value of the up counter 651 will be held by the latch 653 and will become the next preset value of the down counter 652.

By the above operation, the least value of the movement quantity will be held in the output of the latch 653. If the ending signal is input after the set time from the detecting time setting circuit 643, the freezing state will be held for a fixed time from this signal.

Figure 45:
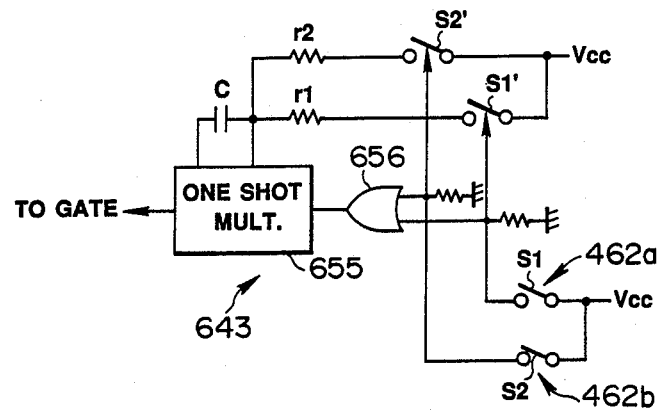
FIG. 45 is a circuit diagram of a detecting time setting circuit.

As shown, for example, in FIG. 45, the above mentioned detecting time setting circuit 463 is formed of a one-shot multivibrator (abbreviated as OSM hereinafter) 655.

An OR circuit 656 is connected to the trigger input end of this OSM 655 so that, when a switch S1 or S2 forming respectively a freezing directing circuit 462a or 462b is set on, a switch S1' or S2' will be on and, after the time T1 or T2 determined by a condenser C and resistance r1 or r2, the OSM 655 will output an ending signal to the gate circuit 654.

Figure 46:
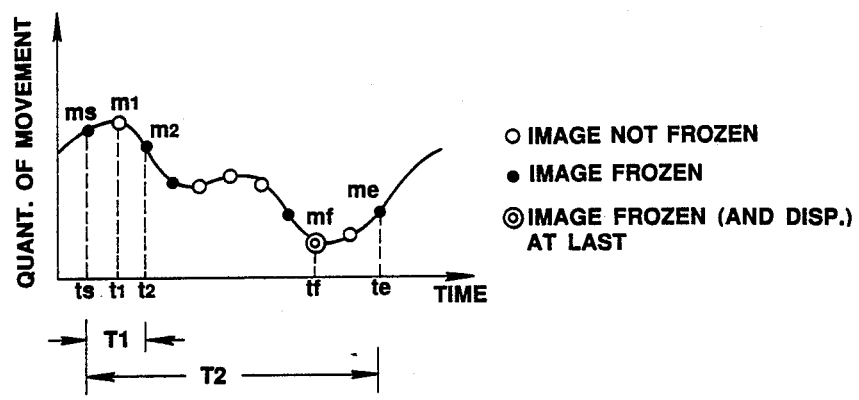
FIG. 46 is an operation explaining diagram of the eighth embodiment.

The freezing operation of the above mentioned least value detecting circuit 641 is shown in FIG. 46 in which ○ represents an image not frozen, ● represents an image to be frozen and ⊙ represents an image to be frozen last. As in this drawing, in the least value detecting circuit 641, first the movement quantity ms of the image signal at the time ts is held and a detecting signal is transmitted to the memory W/R controller 644 so as to read the image signal out of a freezing memory part 635. Then, the movement quantity m1 at the time t1 is compared with the above mentioned ms, the image signal of the smaller value is held (frozen) in the freezing memory part 635 and the frozen image signal is read out. In such case, if ms<m1, the image signal at the time ts will be read out of the freezing memory part 635 and the value of the movement quantity ms will be held. In the same manner, in the image signal at the time t2, if m2<ms, the image signal of the movement quantity ms will be read out of the freezing memory part 635 and the value of the movement quantity ms will be held.

Such operation as in the above is repeated until the time te determined by the detecting time setting circuit 643, the image signal of the least value of the movement quantity within the time of te−ts is frozen in the freezing memory part 635 and the frozen image signal is read out of this freezing memory part 635.

For example, in case the first image freezing directing circuit 642a is operated, a short detecting time T1 will be set and, in case the second image freezing directing circuit 642b is operated, a long detecting time T2 will be set. In such case, in case the user wants to observe the image anyhow as stilled, when the first freezing directing circuit 642a is operated, in the example, for example, in FIG. 46, after the short time T1, the image of the movement quantity m2 will be displayed as a still image.

On the other hand, in case an image of little image movemet is wanted to be recorded, the second image freezing directing circuit 642b may be operated. In this case, as there is a long detecting time T2, an image of little image movement quantity mf can be obtaied.

Thus, according to the seventh embodiment, a still picture meeting the requirement of the user can be obtained.

Figure 47:
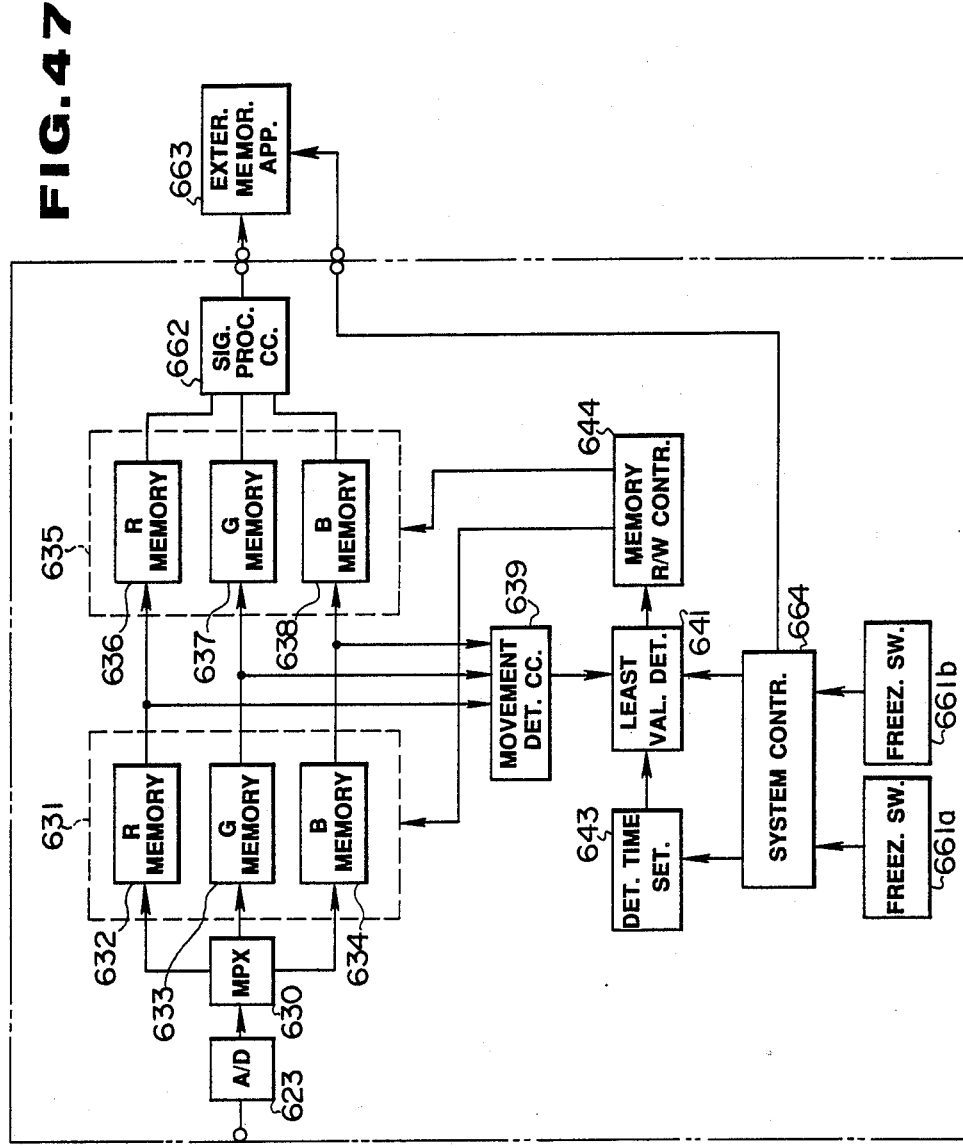
FIG. 47 is a formation diagram of an essential part of an electronic endoscope apparatus of the ninth embodiment of the present invention.

FIG. 47 shows an essential part of the ninth embodiment of the present invention.

In this embodiment, the above mentioned first and second image freezing directing circuits 642a and 642b are formed respectively of a freezing switch 661a and releasing switch 661b. The output signal of the freezing memory part 635 is made, for example, a composite video signal by a signal processing circuit 662 and is output to an outside external recording apparatus 663.

The operating signals by the above mentioned freezing switch 661a and releasing switch 661b are input into a system controller 664 which judges which of the switches 661a and 661b has been operated, transmits a signal to be set at a detecting time corresonding to the respective switches 661a and 661b to a detecting time setting circuit 643 in response to the judgment and starts a least value detecting circuiut 641.

For example, in case the freezing switch 661a is operated, a signal of "H" will be transmitted and, in case the releasing switch 661b is operated, a signal of "L" will be transmitted to switch the detecting time and, after the detecting time, a signal to operate the external memorizing apparatus 663 will be transmitted. The detecting time setting circuit 643 switches thc detecting time in response to this "H" or "L".

Even if there is, for example, any image movement, the detecting time by the above mentioned freezing switch 661a is set to be such time as is not concerned with the waiting time until a still picture is made.

In case the detecting time setting circuuit is used, for example, for an electronic scope, as the half cycle of the cycle of the vibration within the body is about 0.5 second, the time of 0.2 to 0.5 second will be set. This time is to be set at such time as is not felt to be late by the general human sense. If the color framing of this apparatus is 30 Hz (the imaging cycle of R-G-B is repreatd 30 times per second), an image of the least movement quantity between 6 and 15 frames will be able to be obtained.

On the other hand, in case the releasing switch 661b is operated, the system controller 662 will set the detecting time of the detecting time setting circuit 643 to be a long time. That is to say, as this releasing switch 661b is to record an image of an image movement as littel as possible, even if the time until a still picture is obtained is more or less long, in order to elevate the probability of obtaining a still picture of little image movement, a detecting time longer than the detecting time of the freezing switch 661a is set.

In case it is applied to an electronic endoscope apparatus, considering that the movement within the human body is about 0.8 to 1.2 Hz, the probability of the movement becoming the least within about one second is high and therefore the detecting time is set to be about one second.

In case this releasing switch 661b is operated, the system controller 664 will start the external recording apparatus 663 and, after the end of the detecting time, the still picture displayed in the monitor image will be recorded. In this case, the external recording apparatus 663 may be not only a still camera photographing the TV monitor picture but also a photodisc apparatus recording directly the image signal and an image recording apparatus recording an image by a trigger signal (in this case, an output signal of the system controller 664) from outside.

The others are the same as in the above mentioned eighth embodiment.

FIG. 48 shows the tenth embodiment of the present invention. In the above mentioned eighth and ninth embodiments, the present invention is applied to an imaging apparatus of an RGB frame sequential system but, in this tenth embodiment, the invention is applied to an apparatus of a color simultaneously imaging system using an imaging device 672 fitted with a mosaic filter 671 on the imaging surface.

In this tenth embodiment, an optical image of an object imaged by an imaging optical system 673 and formed on the imaging surface of an imaging device 672 is processed by a signal processing circuit 675 under the control of a scanning circuuit 674 to produce an analogue luminance signal AY and analogue color line sequential signal AC. These luminance signal AY and color line sequential signal AC are input into an A/D converter 676 and are converted by this A/D converter to a digital luminance signal DY and digital line sequential signal DC which are written into an image memory 677. The signals read out of this image memory 677 are converted by a D/A converter to analogue signals which are then converted by an NTSC encoder 679 to an NTSC signal which is displayed in an outside monitor 681.

In this embodiment, the above mentioned digital luminance signal DY is input into a movement detecting circuit 639 and the freezing is controlled on the basis of the detected movement quantity.

This takes the visibility of the human eye into consideration. In case the movement is wanted to be detected particularly by noting the color of the object, the movement may be detected by using a digital color signal DC.

In the movement quantity detected by the movement detecting circuiut 639, the least value of the movement quantity within the set time corresponding to the operation of the first or second image freezing directing circuit 642a or 642b is detected by the least value detecting circuit 641 and an image signal judged to be of the least value is displayed in the monitor 681.

By the way, the system shown in the above mentioned eighth or ninth embodiment can be used in setting the detecting time.

By the way, in the above mentioned respective embodiments, in the case of directing freezing, for example, by the first image freezing directing circuit 642a, not only the signal set within a single detecting time may be output but also any detecting time among a plurality of detecting times may be directed.

Also, the image freezing directing means may be one and a plurality of freezing directing signals may be selectively output from this image freezing directing means.

Figure 49A:
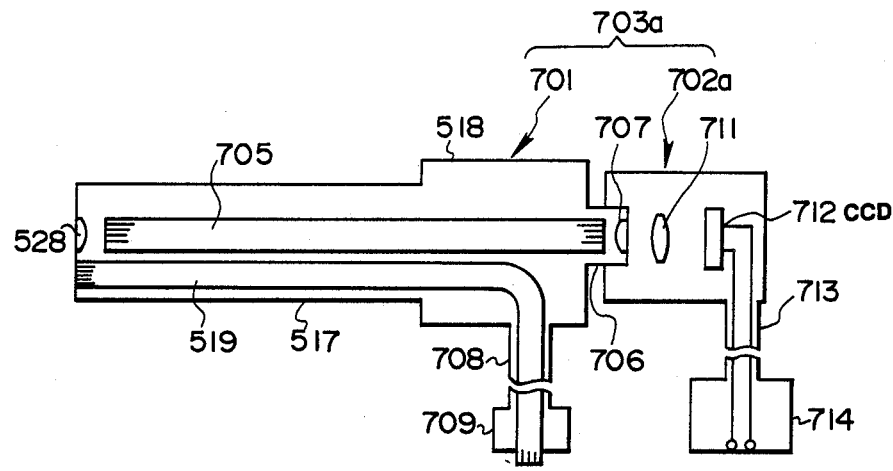
FIG. 49 is a formation diagram of a television camera externally fitted scope which can be used instead of an electronic endoscope.
Figure 49B:
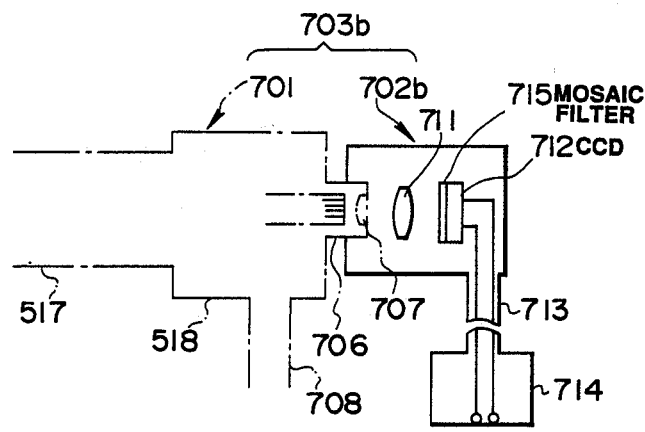

Now, in the above described respective embodiments, a television camera externally fitted scope 703a or 703b comprising a fiber scope 701 and a television camera 702a or 702b fitted to this fiber scope 701 shown in FIG. 49 can be used instead of the electronic scope. For example, the scope 703a in FIG. 49a can be used instead of the electronic endoscope 512 of the frame sequential imaging system shown in FIG. 32. The scope 703b in FIG. 49b can be used instead of the simultaneous type electronic scope 202 shown in FIG. 11.

In the above mentioned fiber scope 701, in te electronic scope 512, one end surface of an image guide 705 is arranged in the focal plane of the objective lens 528 and the optical image is transmitted to the other end surface on the eyepiece part 706 side by this image guide 705.

An eyepiece lens 707 is provided in this eyepiece part 706 so that the optical image transmitted through this eyepiece lens 707 may be observed with a naked eye.

Also, a cable 708 through which the light guide 519 is inserted is extended out of the operating part 518 and a connector 709 fitted to the end of this cable 708 can be connected with a light source unit or the like.

The televisioin camera 702a or 702b fittable to the above mentioned eyepiece part 706 is provided with an image forming lens 711 so as to be able to form an image on a CCD 712. This CCD 712 is connected with a signal line inserted through the cable and a signal connector 714 can be connected to a video processor 574 or the like.

The television camera 702b in FIG. 49b is the television camera 702a in FIG. 50a in which a mosaic filter 715 is fitted to the front surface of the CCD 712.

Now, in case the movement detecting circuits 1 and 1' in the present invention are used, the movement can be selectively detected in only such part in which the variation of the image signal level is large as the outline part.

The formation of a movement detecting circuit 801 in which the movement is selectively detected in only the part in which the level variation is large is shown in FIG. 50.

Two synchronized digital signals R and G pass respectively through delaying lines 802a and 802b and are then input respectively into subtracting circuits 803a and 803b for determinine differences. The signals R and G not delayed are input respectively into the subtracting circuits 803a and 803b and are subtracted and difference signals $\Delta R$ and $\Delta G$ are output.

The above mentioned difference signals $\Delta R$ and $\Delta G$ are input into a difference determining subtracting circuit 805 through a gate circuit 804 to produce a secondary difference signal $\Delta\Delta$.

One of the above mentioned two difference signals $\Delta R$ and $\Delta G$ is input into an input end A of one of two comparators 807 and 808 forming a window comparator 806 and is compared with preset values Pa and Pb of an input end B of the other. In this case, of the difference signal $\Delta R$, a digital value representing a positive polarity is input into the comparator 807 and a digital value of a negative polarity is input into the comparator 808. The respective comparators 807 and 808 output to an OR circuit 809 signals becoming "H" in case A>B.

By the way, in case an absolute value obtained by deleting the sign of the difference signal $\Delta R$ output from the subtracting circuit 802a is used, the window comparator 806 can be replaced with one comparator 807 or 808.

In case the absolute value of the difference signal $\Delta R$ is above a fixed value, the above mentioned OR circuit 809 will output a signal T of "H". The output signal T of this OR circuit 809 controls the gate circuit 804 to open and close. That is to say, only when the signal is "H", the gate circuit 804 will be opened and the two difference signals $\Delta R$ and $\Delta G$ will be output to the subtracting circuit 805.

The absolute value of the secondary difference signal $\Delta\Delta$ of the above mentioned subtracting circuit 805 is determined by an absolute value circuit 811. In case the subtracting circuit 805 outputs in a complementary number of 2, merely the sign may be deleted. The secondary difference signal $\Delta\Delta$ is accumulated by one field period (or one frame period) by an accumulator 812 in the next step and is then input into a divider 813. In this divider 813, the output of a counter 814 counting clocks during the output period of the OR circuit 809 is input and the signal is divided by the output value (that is, the value of the period of "H") of this counter 814. That is to say, the movement detecting operation is standardized in the period in which the movement is being actually detected.

In the above mentioned divider 813, the dividing operation is carried out, for example, with a vertical synchronizing signal VD and the divided value is a detected quantity.

In this movement detecting circuit 801, for example, if the signal R is the one shown in FIG. 51a, such difference signal $\Delta R$ as is shown in FIG. 51b will be produced by the subtracting circuit 803a.

With this difference signal $\Delta R$, by the window comparator 806, as shown in FIG. 51c, a signal period of an absolute value larger than the preset value Pa will be detected. During only this period, the gate circuit 804 will open, a secondary difference signal $\Delta\Delta$ will be produced by the other difference signal $\Delta G$ and the absolute value will be determined by the absolute value circuit 811.

This absolute value of the secondary difference signal is accumulated by the accumulator 812 and is divided by the movement detecting period in the divider 813 to determine the movement quantity.

This movement detecting circuit 801 can detect the movement in only the part in which the variation of the image signal representing the image is large and is standardized in the period in which the movement is actually detected and therefore it can be dissolved that the value of the movement quantity shifts in response to the feature of the image (that is, the image of a large variations or the image of a small variation).

In the above described respective embodiments, the movement detecting means is provided with a plurality of difference signal producing means producing a plurality of difference signals.

Figure 52:
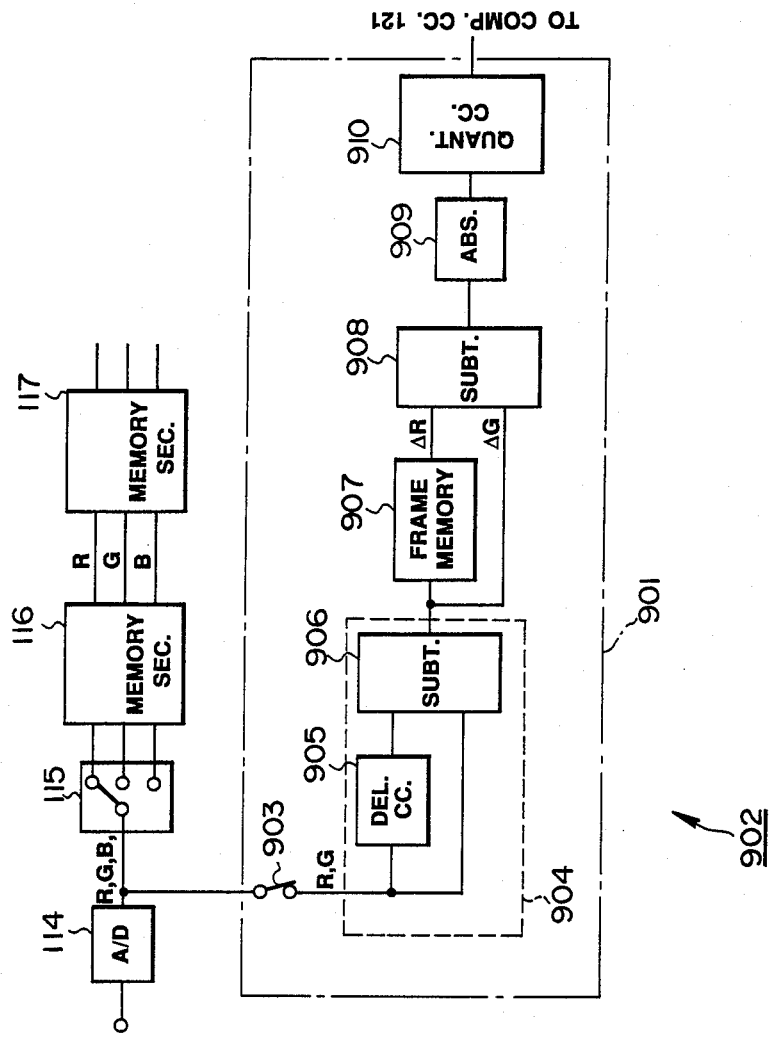
FIG. 52 is a formation diagram of an essential part of the 11th embodiment of the present invention.

FIG. 52 shows an embodiment in which the movement is detected by one difference signal producing means.

For example, in FIG. 1, an electronic endoscope apparatus 902 is formed by using a movement detecting circuit 901 shown in FIG. 51 without using the movement detecting circuit 1.

Among the output signals of the A/D converter, that is, the time serial color signals R, G and B, for example, R is input through a switch 903 into a subtracting circuit 906 through a delaying circuit 905 forming a difference signal producing circuit (coding circuit) 904 and is also input directly into the subtracting circuit 906 without being delayed. A difference signal $\Delta R$ is produced in this subtracting circuit 906 and is input into a frame memory 907. The above mentioned switch 903 will be on during the period, for example, of the color signals R and G.

The difference signal ΔR of one frame is written into the above mentioned frame memory 907, then the color signal G is input and, in the same manner, the difference signal ΔG is produced in the difference signal producing circuit 904 and is input, for example, into a subtracting circuit 908 as a correlation detecting means.

In this subtracting circuit 908, the difference signal of the reading moded frame memory 907 is also input (the difference signal ΔG of the color signal G is not memorized in the frame memory 906) and the difference between both corresponding difference signals ΔR and ΔG is determined. This output is made an absolute value by an absolute value circuit 909, is then made a movement quantity in one frame period by a quantifying circuit 910 and is then input into the comparing circuit 121.

The others are the same as in the above mentioned first embodiment.

In this embodiment, the movemennt is detected for the color signals R and G in different wavelength regions but may be for the other color signals G and B and the movement may be detected for the signals in the same wavelength region.

By the way, different embodiments may be formed by partly combining the respective embodiments of the present invention.

What is claimed is:

1. An electronic endoscope apparatus comprising:
an electronic endoscope provided with:
an elongate insertable part,
an objective optical system provided on the tip side of said insertable part and forming an image of an object,
an imaging device for photoelectrically converting the image based on said objective optical system and
an illuminating light emitting means for emitting an illuminating light from the tip side of said insertable part;
a driving signal outputting means for outputting a driving signal outputting an image signal from said imaging device;
a video signal processing means having an image memorizing means for temporarily memorizing said image signal as a still picture and producing a standard video signal from said image signal;
a movement detecting circuit formed of:
a displaying means for displaying said standard video signal on a monitor picture;
a difference signal producing means for producing difference signals of pixels approaching a plurality of respective image signals representing the images of the object imaged at different times by said imaging means;
a correlation detecting means for detecting a correlation quantity between the corresponding plurality of difference signals proaduced by said difference signal producing means; and output detected by said correlation detecting means; and
a quantifying means for quantifying the signal
an image memorizing controlling means for controlling whether the image signal is memorized or not as a still picture in said image memorizing means on the basis of the movement quantity output from said movement detecting circuit.

2. An electronic endoscope apparatus according to claim 1 wherein said movement detecting circuit has further an n-valuing means for n-valuing the respective difference signals into integers n of at least 2 and outputting them to said correlation detecting means.

3. An electronic endoscope apparatus according to claim 1 or 2 wherein said electronic endoscope is an electronid scope having said imaging device arranged in the focal plane of said objective optical system.

4. An electronic endoscope apparatus according to claim 1 or 2 wherein said electronic endoscope is a television camera externally fitted scope formed of a fiber scope provided with an image guide transmitting an optical image by said objective optical system and a television camera fittable to the eyepiece part of said fiber scope and having said imaging device built-in.

5. An electronic endoscope apparatus according to claim 1 or 2 wherein said light emitting means emits a white color light.

6. An electronic endoscope apparatus according to claim 1 or 2 wherein said light emitting means sequentially emits lights of wavelength regions different from each other.

7. An electronic endoscope apparatus according to claim 1 having a low level region suppressing means for suppressing signals in the low level region on the front step side of said correlation detecting means.

8. An electronic endoscope apparatus accordig to claim 2 having a low level region suppressing means for suppressing signals in the low level region on the front step side of said correlation detecting means.

9. An electronic endoscope apparatus according to claim 1 wherein said difference signal producing means is a subtracting means for subtracting a non-delayed image signal and a delayed image signal.

10. An electronic endoscope apparatus according to claim 1 or 2 further having an image region setting means for detecting the movement of said movement detecting circuit.

11. An electronic endoscope apparatus according to claim 1 or 2 wherein said image memorizing controlling means has a judging means for judging whether the movement quantity of said movement detecting circuit is within a preset allowable reference value or not and controls said image memorizing means to hold a still picture in case said judging means judges the movement quantity to be within said reference value.

12. An elecronic endoscope apparatus according to claim 1 or 2 wherein said image memorizing controlling means has a least movement quantity detecting means for holding as a still picture in said image memmorizing means an image signal of the least movement quantity within a set time.

13. An electronic endoscope apparatus according to claim 12 having a detecting time changing means for changing the time for detecting the image signal of the least movement quantity.

14. An electronic endoscope apparatus according to claim 1 or 2 wherein said movement detecting means detects the movement between a plurality of image signals in the same wavelength region.

15. An electronic endoscope apparatus according to claim 1 or 2 wherein said movement detecting circuit detects the movement between a plurality of image signals in different wavelength regions.

16. A movement detecting circuit comprising:
a difference signal producing means for producing difference signals between pixels approaching a plurality of image signals representing images of an object imaged at different times;

a correlation detecting means for detecting the correlation quantity between the corresponding plurality of difference signals produced by said difference signal producing means; and a quantifying means for quantifying the signal output detected by said correlation detecting means.

17. A movement detecting circuit according to claim 16 further having an n-valuing means for n-valuing the respective difference signals into integers n of at least 2 and outputting them to said correlation detecting means.

18. A movement detecting circuit according to claim 16 further having a low level region suppressing means for suppppressing the signals in the low level region on the front step side of said correlation detecting means.

19. A movement detecting circuit according to claim 17 further having a low level region suppressing means for suppressing the signals in the low level region on the front step side of said correlation detecting means.

20. A movement detecting circuit according to claim 16 wherein said difference signal producing means is a subtracting means for subtracting a non-delayed image signal and an image signal delayed by one or several pixels by the delaying means.

21. A movement detecting circuit according to claim 17 wherein said quantifying means is a counter for counting clocks of a fixed cycle on one of the two valued levels of said correlation detecting means.

22. A movement detecting circuit according to claim 16 or 18 wherein said quantifying means is an integrating means for making an integration for a period of one field/frame.

23. A movement detecting circuit according to claim 19 wherein said low level region suppressing means is an ROM in which data outputting an output signal suppressed in the low level region for an input signal are written.

24. A movement detecting circuit according to claim 19 wherein said low level region suppressing means neglects a single bit or a plurality of bits on the least significant bit side of said n-valued signal.

25. A movement detecting circuit according to claim 16 or 17 further having a discriminating means for discriminating whether the level of at least one difference signal of said difference signal producing means is within a fixed range or not and having a controlling means for detecting said correlation only in the difference signal period deviating from the fixed range.

26. A movement detecting circuit according to claim 25 having a standardizing means for standardizing the output signal of said quantifying means in said difference signal period.

* * * * *